United States Patent
Gouvernel et al.

(10) Patent No.: US 10,872,314 B2
(45) Date of Patent: Dec. 22, 2020

(54) PORTABLE COMPUTERIZED INTERACTIVE TRAINING PROFILE

(71) Applicant: ADP, LLC, Roseland, NJ (US)

(72) Inventors: Jerome Henri Bernard Gouvernel, Maplewood, NJ (US); Jason William Caldwell, Hillsdale, NJ (US); Jordan Scott Birnbaum, New York, NY (US); Nicolas Jean Christophe Delord, New York, NY (US)

(73) Assignee: ADP, LLC, Roseland, NJ (US)

( * ) Notice: Subject to any disclaimer, the term of this patent is extended or adjusted under 35 U.S.C. 154(b) by 251 days.

(21) Appl. No.: 15/223,161

(22) Filed: Jul. 29, 2016

(65) Prior Publication Data

US 2018/0032957 A1    Feb. 1, 2018

(51) Int. Cl.
| | | |
|---|---|---|
| *G06Q 10/10* | (2012.01) | |
| *G06Q 30/02* | (2012.01) | |
| *G06Q 30/08* | (2012.01) | |
| *G06Q 10/08* | (2012.01) | |
| *G06Q 10/00* | (2012.01) | |
| *H04L 29/08* | (2006.01) | |
| *G06Q 50/00* | (2012.01) | |

(52) U.S. Cl.
CPC ....... *G06Q 10/105* (2013.01); *G06Q 10/1053* (2013.01); *H04L 67/306* (2013.01); *G06Q 50/01* (2013.01)

(58) Field of Classification Search
CPC ... G06Q 10/105; G06Q 10/1053; G06Q 50/01
USPC .......................... 705/319, 320, 321, 1.1–912
See application file for complete search history.

(56) References Cited

U.S. PATENT DOCUMENTS

| | | | | |
|---|---|---|---|---|
| 6,256,737 | B1* | 7/2001 | Bianco | G06F 21/32 713/186 |
| 6,584,466 | B1* | 6/2003 | Serbinis | G06F 17/3089 707/754 |
| 9,305,287 | B2* | 4/2016 | Krishnamoorthy | G06Q 30/02 |
| 2003/0229529 | A1* | 12/2003 | Mui | G06Q 10/06 705/328 |

(Continued)

OTHER PUBLICATIONS

Ford, "Identity Management System," U.S. Appl. No. 14/832,501, filed Aug. 21, 2015, 59 pages.

*Primary Examiner* — Jonathan P Ouellette
(74) *Attorney, Agent, or Firm* — Yee & Associates, P.C.

(57) ABSTRACT

A method for maintaining a user profile representing evolving user profile data of a first user, the user profile accessible by a first organization and a second organization without communication between the first organization and the second organization. The method includes creating the user profile by a remote computer based on feedbacks from a corresponding users of the first organization communicating with the remote computer via an application programming interface operating on the remote computer. The user profile data of the user profile is stored on a data source operated only by the third organization. The application programming interface and the remote computer enable connection, over a second network, between a second computer operated by the second organization and the data source having the user profile data. The method further includes thereafter granting access to the user profile to the second computer via the application programming interface.

17 Claims, 14 Drawing Sheets

(56) References Cited

U.S. PATENT DOCUMENTS

| | | | |
|---|---|---|---|
| 2007/0190504 A1* | 8/2007 | Schwartz | G09B 5/00 |
| | | | 434/219 |
| 2007/0203711 A1* | 8/2007 | Nation | G09B 5/00 |
| | | | 434/350 |
| 2008/0313000 A1* | 12/2008 | Degeratu | G06Q 10/06 |
| | | | 705/319 |
| 2009/0286217 A1* | 11/2009 | Kobayashi | G06Q 10/10 |
| | | | 434/350 |
| 2009/0292930 A1* | 11/2009 | Marano | G06F 21/6218 |
| | | | 713/189 |
| 2011/0047183 A1* | 2/2011 | Ford | G06Q 10/08 |
| | | | 707/783 |
| 2011/0161139 A1* | 6/2011 | Maheshwari | G06Q 10/06 |
| | | | 705/7.42 |
| 2013/0046704 A1* | 2/2013 | Patwa | G06Q 10/06 |
| | | | 705/321 |
| 2013/0262333 A1* | 10/2013 | Wicker | G06O 50/265 |
| | | | 705/325 |
| 2013/0282605 A1* | 10/2013 | Noelting | G06Q 10/1053 |
| | | | 705/321 |
| 2015/0006213 A1* | 1/2015 | Heier | G06Q 10/063116 |
| | | | 705/7.16 |
| 2016/0321560 A1* | 11/2016 | Nakhayi Ashtiani | |
| | | | G06F 3/0484 |
| 2017/0031917 A1* | 2/2017 | Levanon | G06F 16/248 |
| 2017/0041296 A1* | 2/2017 | Ford | H04W 12/06 |
| 2017/0193528 A1* | 7/2017 | Brown | G06Q 30/0201 |

* cited by examiner

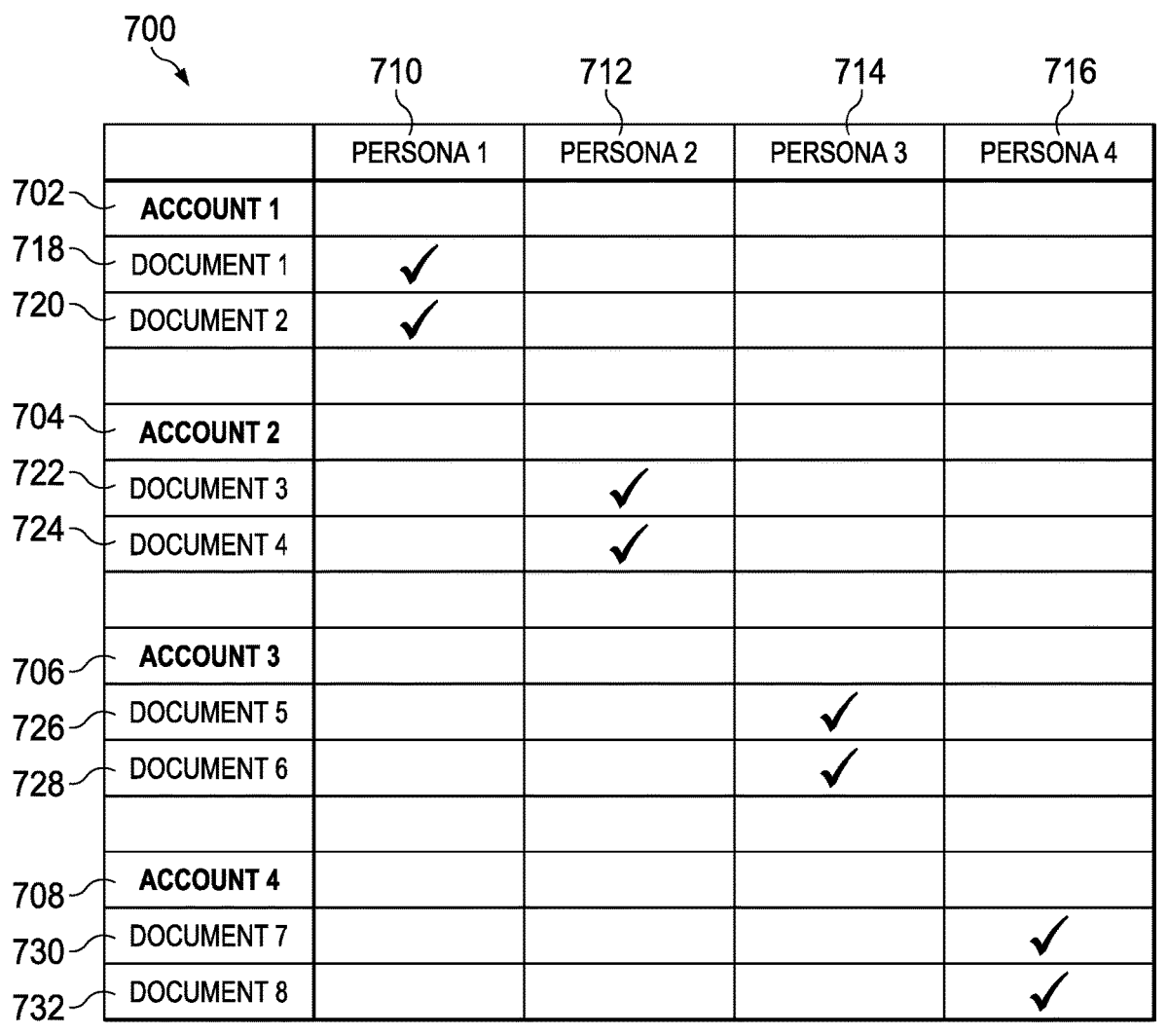

| 700 | PERSONA 1 (710) | PERSONA 2 (712) | PERSONA 3 (714) | PERSONA 4 (716) |
|---|---|---|---|---|
| ACCOUNT 1 (702) | | | | |
| DOCUMENT 1 (718) | ✓ | | | |
| DOCUMENT 2 (720) | ✓ | | | |
| ACCOUNT 2 (704) | | | | |
| DOCUMENT 3 (722) | | ✓ | | |
| DOCUMENT 4 (724) | | ✓ | | |
| ACCOUNT 3 (706) | | | | |
| DOCUMENT 5 (726) | | | ✓ | |
| DOCUMENT 6 (728) | | | ✓ | |
| ACCOUNT 4 (708) | | | | |
| DOCUMENT 7 (730) | | | | ✓ |
| DOCUMENT 8 (732) | | | | ✓ |

FIG. 7

| | PERSONA 1 (710) | PERSONA 2 (712) | PERSONA 3 (714) | PERSONA 4 (716) |
|---|---|---|---|---|
| ACCOUNT 1 (702) | | | | |
| DOCUMENT 1 (718) | ✓ | ✓ | ✓ | ✓ |
| DOCUMENT 2 (720) | ✓ | ✓ | ✓ | ✓ |
| | | | | |
| ACCOUNT 2 (704) | | | | |
| DOCUMENT 3 (722) | | ✓ | | ✓ |
| DOCUMENT 4 (724) | | ✓ | | ✓ |
| | | | | |
| ACCOUNT 3 (706) | | | | |
| DOCUMENT 5 (726) | ✓ | | ✓ | ✓ |
| DOCUMENT 6 (728) | ✓ | | ✓ | ✓ |
| | | | | |
| ACCOUNT 4 (708) | | | | |
| DOCUMENT 7 (730) | | | | ✓ |
| DOCUMENT 8 (732) | | | | ✓ |

9. My manager takes an active interest in my success and personal well-being.

4.60 SCORE
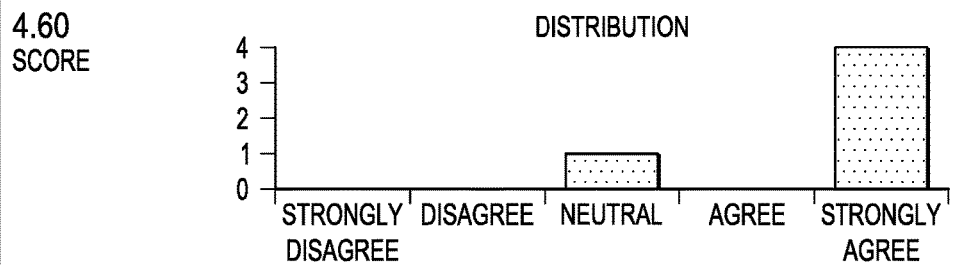

10. My manager challenges me to accelerate my development and takes an active interest in my career growth.

4.60 SCORE
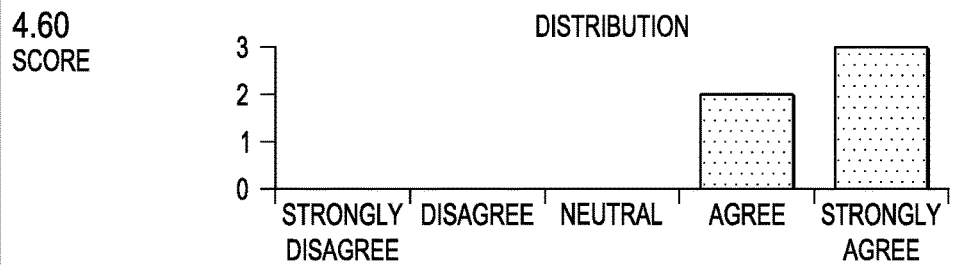

11. My manager gives me sufficient and regular coaching to improve my performance.

4.20 SCORE
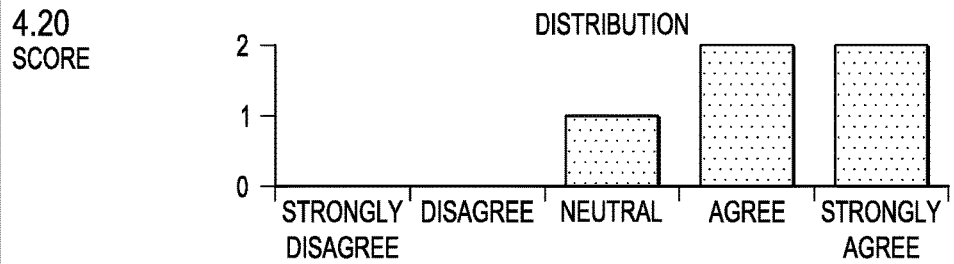

12. My manager encourages me to seek diverse experiences in other business units or functions.

4.00 SCORE
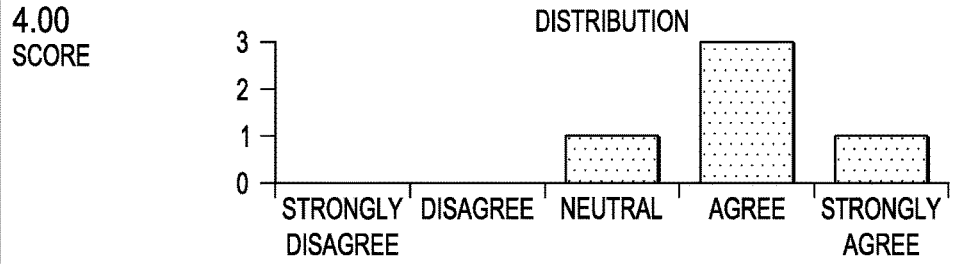

13. What can your manager do to be even more effective in the next 6 month? (Note: Your responses to this item will be reported verbatim to your manager. To ensure confidentiality, do not include your name or other information that may inadvertently identify your response.)

Continue to improve collaboration and transparency among the Money Movement Directors for goals, processes and initiatives. Have more, shorter touch points with all the Directors, with a tight agenda to stay batter connected.

PORTABLE COMPUTERIZED INTERACTIVE TRAINING PROFILE

BACKGROUND INFORMATION

1. Field

The present disclosure relates to methods and devices for addressing the Internet centric challenge of allowing a centralized evolving unique profile of an individual accessible by different employers and other organizations.

2. Background

In the modern workforce individuals may frequently change jobs. However, organizations often desire to build portable computerized interactive training profiles for the individuals. A problem these organizations face is to effectively use the individuals' past profile to continue to build on the profile in the ever-faster-changing world. Workers sometimes need real-time feedback and and-real time needs assessment, followed by near-real-time coaching and training, even as they transfer between multiple disparate organizations that ordinarily do not communicate with each other. Because these organizations do not communicate with each other, training and feedback for these types of individuals may be sub-optimal.

Thus, this type of service is not known or available in the marketplace. However, there are some employment information systems that are known.

For example, an information system may be used to perform services for employer, such as the reuse of employee information from a previous employer. Additionally, an information system also may be used by the employer's human resources department to maintain benefits, documents, qualifications, learning transcript, licenses, payroll records and other records about employees. However, these records and documents typically exist only within the context of the employee's current employment. Once such employment terminates, these records and documents are only available from the former employee.

Many online employment services, job boards, and networking sites allow a user to upload a resume, transcripts, certifications, and other documents. The records and documents from a user's previous employment are often indicative of a skill set, education level, previous employment, and salary. These records and documents can therefore provide insight into the online persona presented by a user in online employment services, job boards, and networking sites.

However, the majority of online employment services, job boards, and networking sites lack the functionality to attest to the veracity of these documents, or validate their authenticity. A user may have an incentive to alter documents within their possession in order to benefit in future employment. Therefore, the veracity of documents that are uploaded to online employment services, job boards, and networking sites from a user's personal hard drive or computer system is suspect. Potential employers and other entities assessing the users online persona may lack confidence that the assertions and representations in the document have not been modified by the end user.

Therefore, it would be desirable to have a method and apparatus that take into account at least some of the issues discussed above, as well as other possible issues. For example, it would be desirable to have a method and apparatus that allows for artifacts from a user's previously employment to be stored in a secure manner, thereby establishing a chain of custody for the document exclusive of the end-user. Furthermore, it would be desirable to have a method and apparatus that allows the end user to selectively presented the stored documents/to other parties with a fine level of granularity. Furthermore, it would be desirable to have a method and apparatus that allows a user to have a user profile or evaluation that is accessible across multiple disparate organizations.

SUMMARY

The illustrative embodiments provide for a method for maintaining a user profile representing evolving user profile data of a first user, the user profile accessible by a first organization and a second organization without communication between the first organization and the second organization. The method includes creating the user profile of the first user. The user profile is created by a remote computer based on a first plurality of feedbacks from a corresponding first plurality of users communicating with the remote computer via an application programming interface operating on the remote computer. The first plurality of users are communicating with the remote computer over a first network. The first plurality of users belong to the first organization. The user profile data of the user profile is stored on a data source connected to the remote computer and operated only by the third organization. The application programming interface and the remote computer enable connection, over a second network, between a second computer operated by the second organization and the data source having the user profile data. The method further includes receiving, from an input device, authorization from the first user to allow the second organization to access the user profile. The method further includes receiving, from the second computer, a request for access to the user profile. Requesting is performed via the application programming interface. The first organization does not communicate with the second organization. The method further includes thereafter granting access to the user profile data to the second computer via the application programming interface.

The illustrative embodiments also provide for a server computer. The server computer includes a processor, a bus connected to the processor, and a non-transitory computer readable storage medium connected to the bus. The non-transitory computer readable storage medium stores program code which, when executed by the processor, provides for a method for granting access to a user profile representing evolving user profile data of a first user, the user profile accessible by a first organization and a second organization without communication between the first organization and the second organization. The program code includes program code for creating the user profile of the first user. The user profile is created by the server computer based on a first plurality of feedbacks from a corresponding first plurality of users communicating with the server computer via an application programming interface operating on the server computer. The first plurality of users are communicating with the server computer over a first network. The first plurality of users belong to the first organization. The user profile data of the user profile is stored on a data source connected to the server computer and operated only by the third organization. The application programming interface and the server computer enable connection, over a second network, between a second computer operated by the second organization and the data source having the user profile data. The program code also includes program code for receiving, from an input device, authorization from the first user to allow the second organization to access the user profile. The program code also includes program code for receiving, from the second computer, a request for access the user profile. Requesting is performed via the application programming interface. The first organization does not communicate with the second organization. The program code also includes program code for, thereafter, granting access to the user profile to the second computer via the application programming interface.

The illustrative embodiments also provide for a computer program product. The computer program product includes a non-transitory computer readable storage medium storing program code which, when executed by a processor of a server computer, provides for a method for maintaining a user profile representing evolving user profile data of a first user, the user profile accessible by a first organization and a second organization without communication between the first organization and the second organization. The program code includes program code for creating the user profile of the first user. The user profile is created by the server computer based on a first plurality of feedbacks from a corresponding first plurality of users communicating with the server computer via an application programming interface operating on the server computer. The first plurality of users are communicating with the server computer over a first network. The first plurality of users belong to the first organization. The user profile data of the user profile is stored on a data source connected to the server computer and operated only by the third organization. The application programming interface and the server computer enable connection, over a second network, between a second computer operated by the second organization and the data source having the user profile data. The program code also includes program code for receiving, from an input device, authorization from the first user to allow the second organization to access the user profile. The program code also includes program code for receiving, from the second computer, a request for access to the user profile. Requesting is performed via the application programming interface. The first organization does not communicate with the second organization. The program code also includes program code for, thereafter, granting access to the user profile to the second computer via the application programming interface.

In one illustrative embodiment, a method for managing documents within an identity management system is presented. A computer system receives a document. The document is received within an authentication contexts of a user. The computer system determines a chain of custody for the document. The computer system stores the document. The computer system sets document privileges for the document based on the authentication contexts in the chain of custody.

In another illustrative embodiment, a computer system comprises an identity management system for managing documents within an identity management system. The identity management system receives a document. The document is received within an authentication contexts of a user. The identity management system determines a chain of custody for the document. The identity management system stores the document. The identity management system sets document privileges for the document based on the authentication contexts in the chain of custody.

In yet another illustrative embodiment, a computer program product for managing documents within an identity management system comprises a computer readable storage media, and program code stored on the computer readable storage media. The program code instructs an identity management system to receive the document. The document is received within a comment authentication contexts of the user. The program code instructs the identity management system to determine a chain of custody for the document. The program code instructs the identity management system to store the documents. The program code instructs the identity management system to set document privileges for the document based on the authentication contexts and the chain of custody.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a persona privileges interface shown within a graphical user interface showing default privileges for documents depicted in accordance with an illustrative embodiment;

FIG. 8 is an illustration of a persona privileges interface shown within a graphical user interface showing user modified privileges for documents depicted in accordance with an illustrative embodiment;

FIG. 16 is part of an example survey results which may reflect industry standard benchmarks for evaluating a manager.

DETAILED DESCRIPTION

Figure 1:
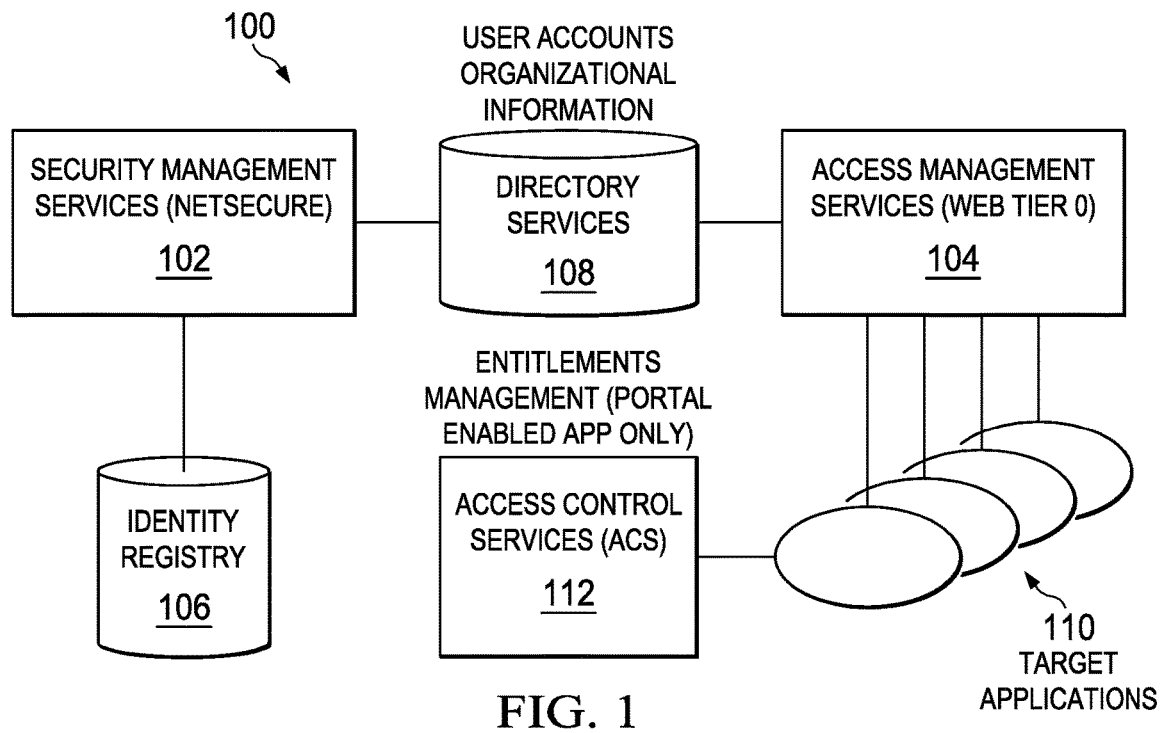
FIG. 1 is an illustration of a block diagram of an identity service solution depicted in accordance with an illustrative embodiment.

The illustrative embodiments recognize and take into account that in some organizations workers need real-time feedback and real-time needs assessment, followed by near-real-time coaching and training. In a modern work environment where workers may quickly change organizations, a training or evaluation profile of a worker may desirably reflect benchmark information and allow a new organization to continue training and development based on an existing dynamic profile. The illustrative embodiments recognize and take into account that currently such a portable profile does not exist for use among organizations that do not communicate with each other.

The present disclosure also relates generally to an improved data processing system. In particular, the present disclosure also relates to a method and apparatus for managing the various online profiles of a user. Still more particularly, the present disclosure also relates to a method and apparatus for a graphical user interface used in managing online user profiles that allows a user to carry data from different sources to be verified by a chain of custody and stored in a secure manner that allows the end user to selectively and granularly present the data to other parties.

The illustrative embodiments also recognize and take into account that end users have multiple personas over time and that there is novelty and value to providing those end users with verified and secure management of their employment histories.

The advantageous embodiments also recognize and take into account that an evolving profile might be accessible by several organizations and the user, but not necessarily edited by the same, or that only certain aspects of the user profile may be edited. For example, employment history and biographical information such as birthday, social security number, etc. may be changed only with authorization by the profile manager, a third party. Other data in the user profile could be updated by the user or by other organizations.

The illustrative embodiments also recognize and take into account that managing various documents from a plurality of different employers within online profiles may be more difficult to compare than desired. The illustrative embodiments also recognize and take into account that attesting to the veracity of documents submitted from a user as part of an online profile may be more difficult than desired depending on the relationship between the profile manager and the service provider.

Thus, the illustrative embodiments also provide a method and apparatus for managing and verifying various documents received from a plurality of different employers as part of an identity management system. Additionally, the embodiments provide methods and apparatus for managing multiple identities and social providers and enables the association of one or more of these user accounts to the user persona and history. An identity management system is provided for managing documents within a computer system. The computer system receives a document within an authentication contexts of a user. The computer system determines a chain of custody for the document. The computer system stores the document. The computer system sets document privileges for the document based on the authentication contexts and the chain of custody.

With reference now to the figures and in particular with reference to FIG. 1, an illustration of a block diagram of an identity service solution is depicted in accordance with an illustrative embodiment. As depicted, identity management system 100 separated the two main components: security management services 102 and access management services 104.

Security management services 102 is a set of components that provides identity management for individuals, products, and organizations. Security management services 102 performs functions such as Identity Management, User Registration, User Account Administration, Client Administration and Product Administration.

Access management services 104 is a set of components that enforce authentication and routing policies to web applications. Access management services 104 perform functions such as User Authentication, Federation Access, Session Management, URL/Resource Policy Enforcement, Routing and SSO to Applications, Web Services Access (SOAP), and Certificate Management.

Identity registry 106 is a register of the identity of individuals, products, and organizations, as well as information about those entities. Security management services 102 accesses identity registry 106 when verifying the identity of individuals, products, and organizations.

Directory services 108 stores, organizes, and provides access management services 104 with access to information typically managed by security management services 102, such as user accounts and organizational information. Directory services 108 allows the lookup of user accounts and organizational information as well as privileges and restrictions associated with the user account and organizational information.

Target applications 110 are computer programs designed to permit authenticated users to perform a group of coordinated functions, tasks, or activities. Access to target applications 110 is controlled by access management services 104, based on verifying the identity of the user.

As depicted, identity management system 100 includes access control services 112. Access control services 112 works in conjunction with access management services 104 to provide access to applications and data. According to an illustrative embodiment, access control services 112 provides a minimum level of access to applications and data for a minimum amount of time necessary to complete the requested service.

Figure 2:
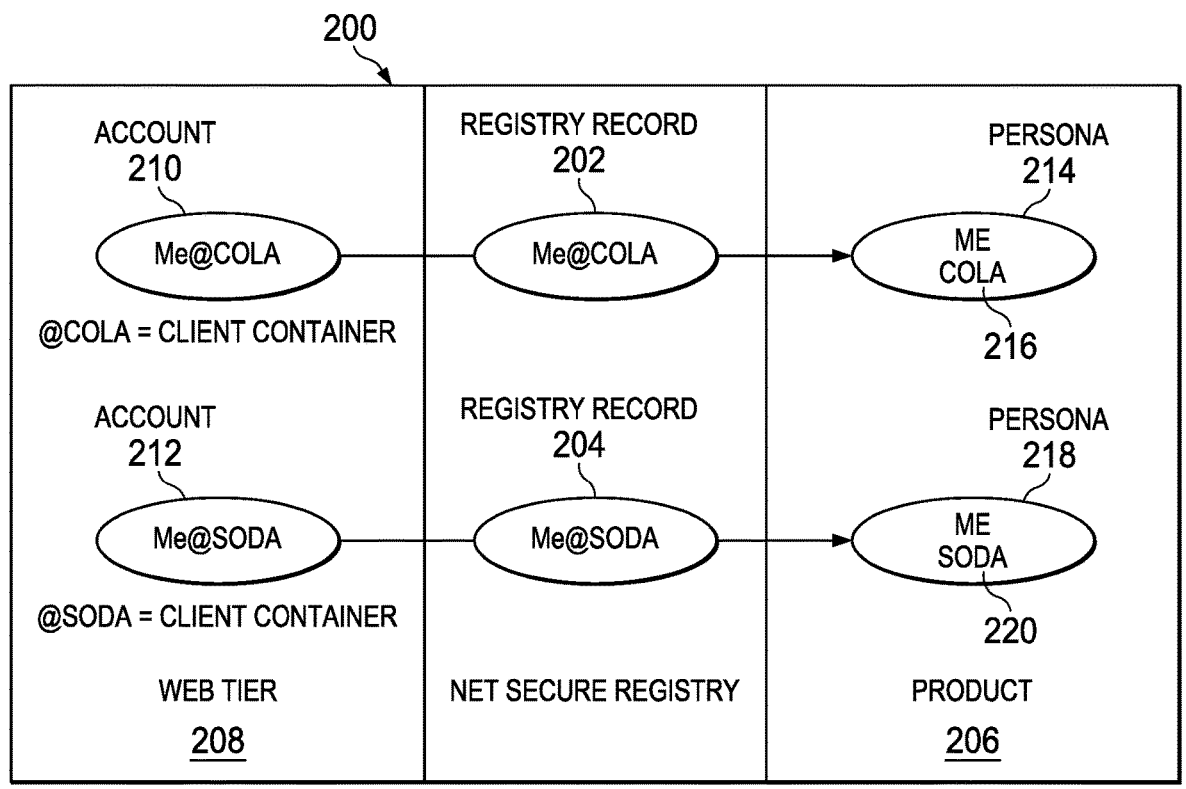
FIG. 2 is an illustration of an organizational diagram of a registry record within an identity registry depicted according to the prior art.

Referring now to FIG. 2, an organizational diagram of a registry record within an identity registry is depicted according to the prior art. Identity management system 200 is an example of an identity management system, such as identity management system 100 of FIG. 1, that uses a registry record organization scheme according to the prior art.

As depicted, identity management system 200 includes a database (not shown) having registry record 202 and registry record 204. The database can be, for example identity registry 106 of FIG. 1, using the registry record organization scheme described with reference to FIG. 2. Registry record 202 and registry record 204 are entries within the database.

As depicted, a client accesses product 206 from web tier 208 through one of account 210 and account 212. Product 206 is a target application, such as one of target applications 110 of FIG. 1. Web tier 208 is a collection of one more data processing systems that displays product information and personalized content for product 206 to the user. Upon verification of the user's identity, web tier 208 makes content of product 206 available to the user.

Account 210 is a user account that is specific to registry record 202. Registry record 202 points to persona 214 of the user, corresponding to a particular instance of product 206 executing a particular client container 216.

Client container 216 is a set of classes, libraries and other files required for execution of product 206 for a specific entity, which are bundled with the application client for execution. Access to the classes, libraries and other files of client container 216 is limited to authorized registry records, such as registry record 202, based on verification of account 210.

Account 212 is a user account that is specific to registry record 204. Registry record 204 points to persona 218 of the user, corresponding to a particular instance of product 206 executing a particular client container 220.

Client container 220 is a set of classes, libraries and other files required for execution of product 206 for a specific entity, which are bundled with the application client for execution. Access to the classes, libraries and other files of client container 220 is limited authorized registry records, such as registry record 204, based on verification of account 212.

Identity management system 200 therefore creates a separate registry record for each persona of the user, depending on the context of the user, as determined by the account which the user accesses identity management system 200. The creation of separate registry records generally prevents identity management system 200 from unintentional disseminating unauthorized information between entities of different accounts, such as between a first employer and a second employer of the user.

For example, identity management system 200 maintains registry record 202 to create persona 214 for a user in the context of a first employer, for which product 206 is implemented using client container 216. Identity management system 200 maintains registry record 204 as a separate entity, distinct from registry record 202. Therefore, identity management system 200 maintains registry record 204 to create persona 218 for a user in the context of a second employer, for which product 206 is implemented using client container 220. Single-user can therefore exists as a plurality separate entities, each having a separate registry records, within identity management system 200, despite any redundancy of personal identifying information.

Figure 3:
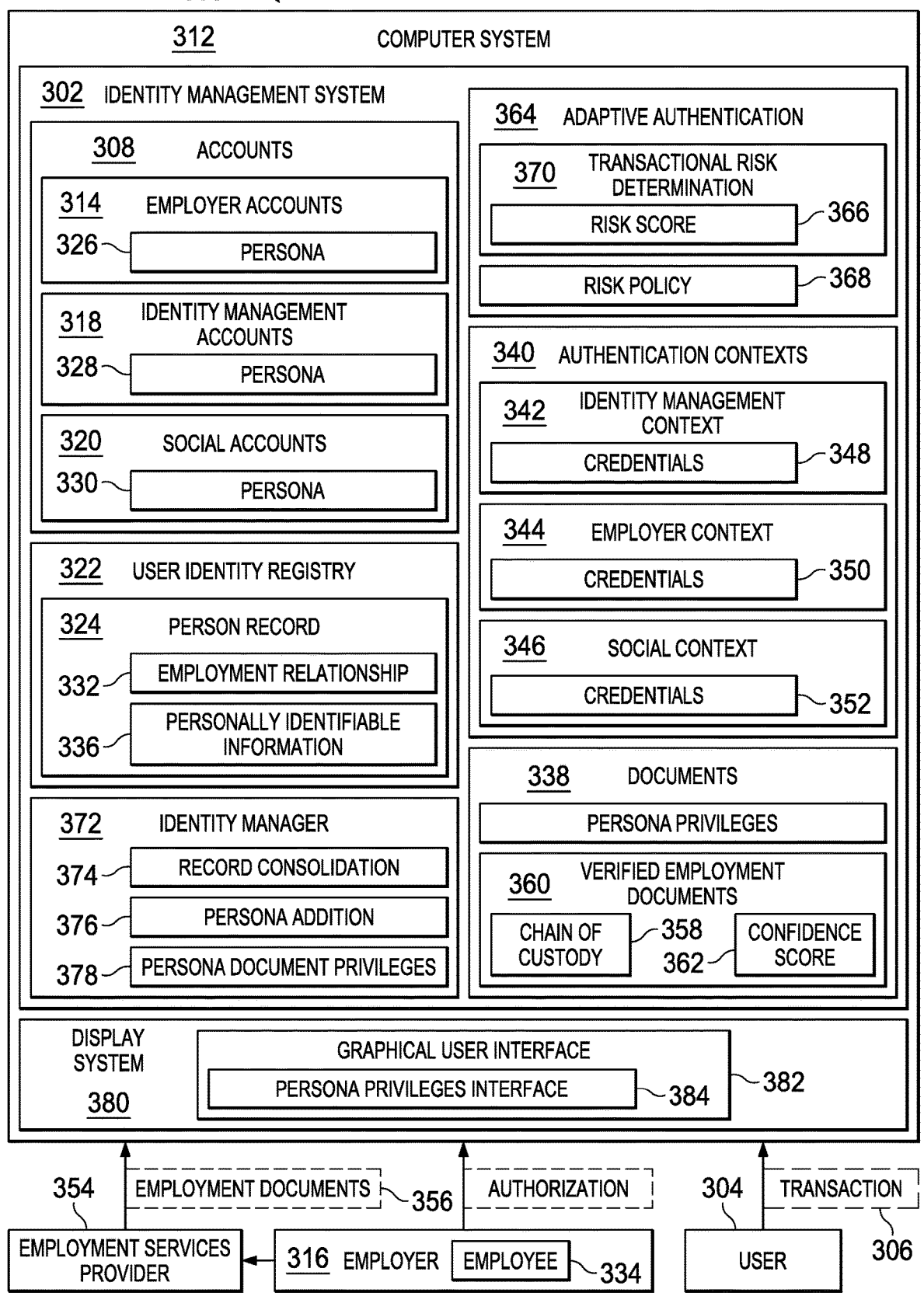
FIG. 3 is an illustration of a block diagram of an identity management environment depicted in accordance with an illustrative embodiment.

With reference now to FIG. 3, an illustration of a block diagram of an identity management environment is depicted in accordance with an illustrative embodiment.

Identity management environment 300 includes identity management system 302. Identity management system 302 is used to perform operations with respect to user 304. The operations can be, for example, but not limited to, at least one of validation of an identity of the user 304, performing transaction 306 related to one or more accounts 308, and performing transaction 306 to manage the privileges of documents 310.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Identity management system 302 can be implemented in computer system 312, where the computer system is a hardware system includes one or more data processing systems. When more than one data processing system is present, those data processing systems may be in communication with each other using a communications medium. The communications medium may be a network. The data processing systems may be selected from at least one of a computer, a workstation, a server computer, a tablet computer, a laptop computer, a mobile phone, a personal digital assistant (PDA), or some other suitable data processing system.

Identity management system 302 includes accounts 308. Employer accounts 314 are ones of accounts 308 that are maintained by identity management system 302 for the benefit of employer 316. Employer accounts 314 includes persona 326 of user 304. Persona 326 is a representation of user 304 in the context of employer accounts 314. Persona 326 includes any granularly designated information by user 304, such as at least one of person record 324, including employment relationship 332 and personally identifiable information 336, and documents 338.

Identity management accounts 318 are ones of accounts 308 that are maintained by identity management system 302 for the benefit of user 304, and do not include a context of employer 316. Identity management accounts 318 includes persona 328 of user 304. Persona 328 is a representation of user 304 in the context of identity management accounts 318. Persona 328 includes any granularly designated information by user 304, such at least one of person record 324, including employment relationship 332 and personally identifiable information 336, and documents 338.

Social accounts 320 are ones of accounts 308 that are maintained by a social media provider for the benefit of user 304. Social accounts 320 includes persona 330 of user 304. Persona 330 is a representation of user 304 in the context of social accounts 320. Persona 330 includes any granularly designated information by user 304, such as at least one of person record 324, including employment relationship 332, personally identifiable information 336, and documents 338.

Identity management system 302 includes user identity registry 322. User identity registry 322 is a register of users, such as user 304, that can access identity management stem 302.

Identity management system 302 maintains person record 324 in user identity registry 322. Person record 324 is an entry of user 304 within user identity registry 322 that is not exclusively associated with a particular employer, such as employer 316, or a particular client container, such as one of client container 216 or client container 220 of FIG. 2. By removing the context of employer 316 from person record 324, identity management system 302 enables the capacity for user 304 to consolidate multiple personae, such as persona 326, persona 328, and persona 330, from different ones of accounts 308 into a single entry of person record 324 within user identity registry 322.

Person record 324 includes employment relationship 332. Employment relationship 332 is an interrelation, interconnection, or association between user 304, as identified within person record 324, and employer 316. Employment relationship 332 denotes certain conditions under which user 304 performs, has performed, or is willing to perform work or services for employer 316. Employment relationship 332 can exist when user 304 is a current or former one of employee 334 of employer 316. Employment relationship 332 can exist when user 304 applies to be employee 334 of employer 316.

Person record 324 includes personally identifiable information 336. Personally identifiable information 336 is information that can be used on its own or with other information to identify, contact, or locate user 304.

Identity management system 302 authenticates the identity of user 304 in one or more of the authentication contexts 340. Authentication contexts 340 are the different circumstances and environments under which identity management system 302 verifies the identity of user 304. For example, identity management system 302 may verify the identity of user 304 in at least one of identity management context 342, employer context 344, and social context 346.

Identity management context 342 is one of authentication contexts 340 that is associated with identity management accounts 318. Identity management context 342 can be provided by a context from identity management accounts 318. Identity management context 342 includes credentials 348. Credentials 348 are at least one of attestations, assurances, veracities or validations of identity of user 304 that are required by identity management system 302 to validate the identity of user 304 in identity management context 342.

Employer context 344 is one of authentication contexts 340 that is associated with employer account 314. Employer context 344 can be provided by a context from employer account 314. Employer context 344 includes credentials 350. Credentials 350 are at least one of attestations, assurances, veracities or validations of identity of user 304 that are required by identity management system 302 to validate the identity of user 304 in employer context 344.

Social context 346 is one of authentication contexts 340 that is associated with social accounts 320. Social context 346 can be provided by a context from social accounts 320. Social context 346 includes credentials 352. Credentials 352 are at least one of attestations, assurances, veracities or validations of identity of user 304 that are required by identity management system 302 to validate the identity or user 304 in social context 346.

By allowing for authentication of user 304 within social context 346, identity management system 302 allows for many mundane account administrative tasks, such as recovery of a lost password, password reset requests, and password policy, to be automated and off-loaded to the social identity provider. Furthermore, the social identity providers are often better equipped to provide aid to user 304 with these mundane account administrative tasks than would be employer 316 or employment services provider 354.

Employment services provider 354 performs operations with respect to employer 316. The operations can be, for example but not limited to, providing payroll management services for employer 316. Payroll management services can include, for example but not limited to, accounting services provided by employment services provider 354 to employer 316 that tracks amounts aid to employees for services they provided during a certain period of time. As part of providing payroll management services, employment services provider 354 can store employment documents 356 in identity management system 302.

In an illustrative embodiment, employment services provider 354 generates employment documents 356 related to persona 326. Employment documents 356 can include, for example, at least one of a W-4 document of employee 334, an E-I9 document of employee 334, a W-2 document of employee 334, or a Pay Statement document of employee 334. Additionally, employment document 356 can include, for example, at least one of certifications earned by employee 334 during employment with employer 316, training courses completed by employee 334 during employment with employer 316, employment evaluations of employee 334 by employer 316, and any other documents generated with regard to user 304 in his role as employee 334 of employer 316.

Identity management system 302 stores employment documents 356 as documents 338. In an illustrative embodiment, employment documents 356 are submitted to identity management system 302 directly from employment services provider 354, thereby creating chain of custody 358. Chain of custody 358 is a chronological documentation showing the custody, control, transfer, dissemination, and disposition of employment documents 356. Verified employment documents 360 are ones of documents 338 having chain of custody 358 that include only trusted entities, such as employer 316 and employment services provider 354, prior to receipt of employment document 356 by identity management system 302.

Identity management system 302 also allows for direct submission of documents by third-party, through an application programming interface (API), or by direct upload from user 304. Identity management system 302 also stores these directly submitted documents as documents 338. However, these documents would not have the same assertion of authenticity as documents acquired having chain of custody 358. Identity management system 302 does not store documents lacking chain of custody 358 as verified employment documents 360.

In an illustrative embodiment, chain of custody 358 can be reflected in confidence score 362. Confidence score 362 is a quantified score related to the veracity of each of documents 338. Verified employment documents 360 that are received into identity management system 302 by way of a verified chain of custody 358 may have a higher confidence score 362 associated with the document. Documents 338 that are not received into identity management system 302 by way of a verified chain of custody 358 may have a lower confidence score 362 associated with the document. Similarly, the confidence score can be adjusted based on at least one of the number of entities and identity of entities having custody or control of the submitted document.

Identity management system 302 includes adaptive authentication 364. Adaptive authentication 364 is an authentication and fraud detection platform for authenticating the identity of user 304 in response to transaction 306 submitted within a particular one of authentication contexts 340. Adaptive authentication 364 is a risk-based, multifactor authentication. Using a risk and rules based approach, adaptive authentication 364 may require additional identity assurance for a particular transaction, such as at least one of transaction 306 that have a high risk score 366, transaction 306 violates risk policy 368, and combinations thereof.

Adaptive authentication 364 includes transactional risk determination 370. Transactional risk determination 370 is a self-learning statistical evaluation of the risk of transaction 306. In an illustrative embodiment, transactional risk determination 370 generates risk score 366 for each transaction 306 performed by user 304. In an illustrative embodiment, risk score 366 can be a numeric score within a predefined range, where higher scores indicate a greater level of risk. In an illustrative embodiment, transactional risk determination 370 determines risk score 366 according to at least one of device profiling, behavioral profiling, and data within a repository of known fraud patterns.

Adaptive authentication 364 includes risk policy 368. Risk policy 368 is at least one of rules, laws and practices that outlines access and authentication restrictions for transaction 306. Adaptive authentication 364 translates risk policy 368 into decisions and actions through the use of a comprehensive rules framework. Adaptive authentication 364 can be used to set risk score 366 that will require later review, prompt additional assurance or "Step-up" Authentication from user 304. Additionally, adaptive authentication 364 may deny transaction 306 where the likelihood of fraud is very high. Adaptive authentication 364 creates risk policy 368 independently of risk score 366 as determined by transactional risk determination 370, such as blocking authentication from a specific IP address.

Identity management system 302 includes identity manager 372. Identity manager 372 enables the granular management of at least one of person record 324 and documents 338 by user 304.

Identity manager 372 may be implemented in software, hardware, firmware or a combination thereof. When software is used, the operations performed by identity manager 372 may be implemented in program code configured to run on hardware, such as a processor unit. When firmware is used, the operations performed by identity manager 372 may be implemented in program code and data and stored in persistent memory to run on a processor unit. When hardware is employed, the hardware may include circuits that operate to perform the operations in identity manager 372.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In an illustrative embodiment, identity manager 372 includes record consolidation 374. Record consolidation 374 is a process that identifies duplicate or related records within user identity registry 322, and allows user 304 to consolidate the records into a single one of person record 324.

In an illustrative embodiment, identity manager 372 includes persona addition 376. Persona addition 376 is a process that identifies additional personae of user 304. Therefore, persona addition 376 and allows user 304 to create an additional authentication context 340, using the identified additional persona of the user 304 in the context of an identified account.

Identity manager 372 includes persona document privileges 378. Persona document privileges 378 is a selectable control that provides user 304 with granular control of the presentation of documents 338 to persona 326 of employer 316, persona 328 of identity management accounts 318, and persona 330 of social accounts 320.

As depicted, identity management environment 300 includes display system 380. In this illustrative example, display system 380 can be a group of display devices. A display device in display system 380 may be selected from one of a liquid crystal display (LCD), a light emitting diode (LED) display, an organic light emitting diode (OLED) display, and other suitable types of display devices.

In this illustrative example, display system 380 includes graphical user interface 382. In this illustrative example, identity management system 302 can display information such as for example, at least one of persona document privileges 378 or other suitable information in graphical user interface 382.

Identity management system 302 may receive user input selecting the displayed information in graphical user interface 382. Identity management system 302 may also receive user input through graphical user interface 382 to selectively publish the various documents 338 to different ones of persona 326, persona 328, and persona 330, regardless of the context in which the documents were received.

In an illustrative example, graphical user interface 382 includes persona privileges interface 384. Persona privileges interface 384 is an interface that allows user 304 to interact with identity manager 372, setting persona document privileges 378 for documents 338. Persona privileges interface 384 therefore enables user 304 to selectively publish the various documents 338 to different ones of persona 326, persona 328, and persona 330, regardless of the context in which the documents were received.

As a result, computer system 312 operates as a special purpose computer system in which identity manager 372 in computer system 312 enables user 304 to selectively publish the various documents 338 to different ones of persona 326, persona 328, and persona 330, regardless of the context in which the documents were received.

Identity manager 372 enables a granular control for selectively publishing various documents 338 to different ones of persona 326, persona 328, and persona 330, regardless of the context in which the documents were received. Thus, identity manager 372 transforms computer system 312 into a special purpose computer system as compared to currently available general computer systems that do not have identity manager 372.

The illustration of identity management system 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
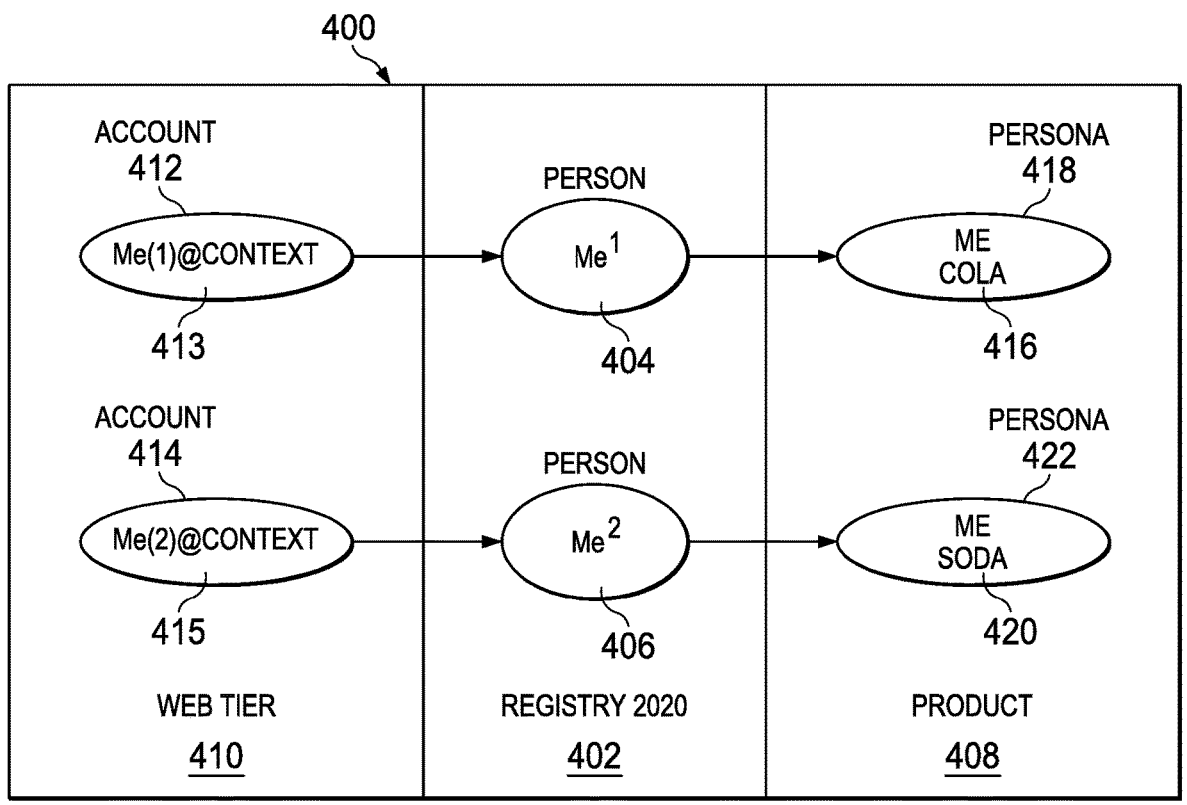
FIG. 4 is an illustration of an organizational diagram of a registry record within an identity registry depicted as according to an illustrative embodiment.

With reference now to FIG. 4, an organizational diagram of a registry record within an identity registry is shown according to an illustrative embodiment. Identity management system 400 is an example of an identity management system 302 of FIG. 3.

As depicted, identity management system 400 includes a database (not shown) having person record 402. Person record 402 is an example of person record 324 of FIG. 3. Person record 402 includes employment relationship 404 and employment relationship 406. The database can be, for example identity registry 106 of FIG. 1. Person record 402 is an entry within the database having a set of one or more employment relationships.

Identity management system 400 introduces the concept of a natural person by removing the employer context from person record 402 of identity management system 400. Web tier 410 includes account 412 and account 414. Each of account 412 and account 414 is presented in the context of an employer. However, rather than maintain a separate registry entry for each of account 412 and 414, identity management system 400 distinguishes between persona 418 and persona 422 based on which of authentication contexts 413 and authentication contexts 415 is used to access identity management system 400, as well direct indication of a persona from the user.

As depicted, a user accesses product 408 from web tier 410 through one of account 412 and account 414. Product 408 is a target application, such as one of target applications 110 of FIG. 1. Web tier 410 is a collection of one more data processing systems that displays product information and personalized content for product 408 to the user. Web tier 410 makes content of product 408 available to the user.

Account 412 is a user account that is associated with, but not the specific to, person record 402. However, account 412 is specific to a particular instance of product 408, requiring the execution of client container 416. Based on account 412 providing a context for product 408, identity manager 372 of FIG. 3 points person record 402 to a particular instance of product 408 executing in client container 416. Identity management system 400 authenticates a user within authentication contexts 413, allowing the user to then access product 408 in the user's context of persona 418, corresponding to account 412.

Client container 416 is a set of classes, libraries and other files required for execution of product 408 for a specific entity, such as employer 316 of FIG. 3, which is bundled with the application client for execution. Access to the classes, libraries and other files of client container 416 is limited by identity manager 372 based on account 412 providing a context for the specific instance of product 408.

Account 414 is a user account that is associated with, but not the specific to, person record 402. However, account 414 is specific to a particular instance of product 408, requiring the execution of client container 420. Based on account 414 providing a context for product 408, identity manager 372 points person record 402 to the particular instance of product 408 executing in client container 420. Identity management system 400 authenticates a user within authentication contexts 415, allowing the user to then access product 408 in the user's context of persona 418, corresponding to account 414.

Client container 420 is a set of classes, libraries and other files required for execution of product 408 for a specific entity, such as employer 316 of FIG. 3, which is bundled with the application client for execution. Access to the classes, libraries and other files of client container 420 is limited by identity manager 372 based on account 414 providing a context for a specific instance of product 408.

Identity management system 400 therefore creates a single person record 402 for the user. However, identity manager 372 of FIG. 3 provides access to different instances of product 408 depending on the context provided by the accessing account, such as account 412 or account 414. Based on the context provided by the accessing account, identity manager 372 authorizes access to various classes, libraries and other files required by the different product instances executing within client container 416 and client container 420. Identity manager 372 therefore prevents the unintentional dissemination of information between entities, such as the first employer and the second employer.

For example, identity management system 400 maintains person record 402 to create persona 418 for a user in the context of a first employer, for which product 408 is implemented using client container 416. Identity manager 372 of FIG. 3 enables Identity management system 400 to maintain the same person record 402 to create persona 422 for a user in the context of a second employer, for which product 408 is implemented using client container 420. Therefore, identity manager 372 enables identity management system 400 to maintain a single person record 402 to implement both persona 418 and persona 422, eliminating redundancy of personal identifying information of the user.

Figure 5:
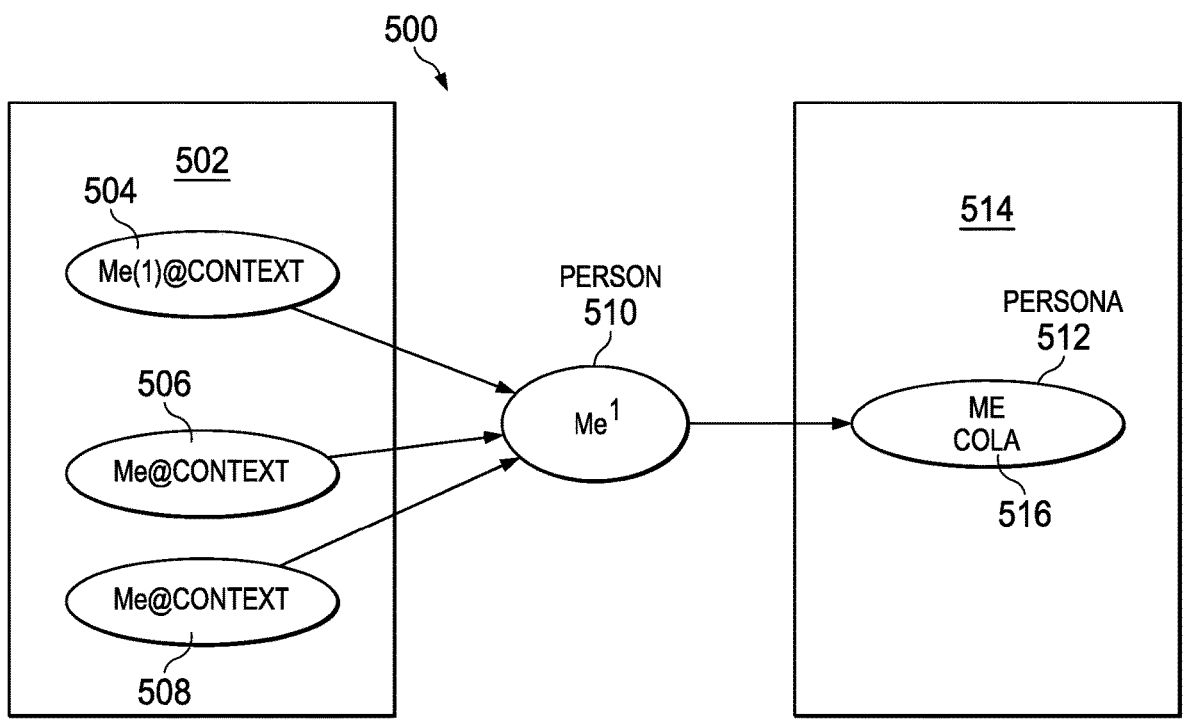
FIG. 5 is an illustration of diagram of accessing a product instance through one of a plurality of context depicted according to an illustrative embodiment.

With reference now to FIG. 5, an illustration of diagram of accessing a product instance through one of a plurality of context is shown according to an illustrative embodiment.

As depicted, web tier 502 includes authentication contexts 504, authentication contexts 506, and authentication contexts 508. Each of authentication contexts 504, authentication contexts 506, and authentication contexts 508 is one of authentication contexts 340 of FIG. 3, and provides a context by which identity management system 500 authenticates the identity of a user, such as user 304 of FIG. 3. Once authenticated, the user can then perform various actions with respect to persona 512 for which product 514 is implemented using client container 516.

As depicted, authentication contexts 504 is an identity management context, such as identity management context 342 of FIG. 3, and is specific to identity management system 500. Authentication contexts 504 includes credentials, such as credentials 348 of FIG. 3, that provide at least one of attestations, assurances, veracities or validations of identity of user 304 that are required to access identity management system 500 from authentication contexts 504.

As depicted, persona 512 is persona 326 of FIG. 3. However, persona 512 can be any persona provided by a particular authentication contexts, such as persona 326, persona 328, and persona 330 of FIG. 3. Persona 512 is a representation of a user, such as user 304, in the context of an employer, such as employer 316. Persona 512 includes any granularly designated information by user 304, such at least one of person record 324, including employment relationship 332 and personally identifiable information 336, and documents 338.

As depicted, authentication contexts 506 and authentication contexts 508 is a social context, such as social context 346 of FIG. 3. Authentication contexts 506 is specific to a first social media profile of user 304, maintained by a first social media provider. Authentication contexts 508 is specific to a second social media profile of user 304, maintained by a second social media provider.

Authentication contexts 506 and authentication contexts 508 includes credentials, such as credentials of FIG. 3, that provide at least one of attestations, assurances, veracities or validations of identity of user 304 that are required to access identity management system 500 from authentication contexts 504. The credentials of authentication contexts 506 may be the same or different from the credentials of authentication contexts 508. Furthermore, the credentials of authentication contexts 506 and authentication contexts 508 may be the same or different from the credentials of context 504.

By allowing for authentication of user 304 of FIG. 3 within authentication contexts 506 and authentication contexts 508, identity management system 500 allows for many mundane account administrative tasks to be automated and off-loaded to the social identity provider. However, because a social media provider may not require as stringent attestations, assurances, veracities or validations of identity of user 304, transaction 306 performed by user 304 using authentication contexts 506 and authentication contexts 508 may have a higher associated transactional risk than would a similar action using authentication contexts 504.

Identity management system 500 includes an adaptive authentication, such as adaptive authentication 364 of FIG. 3. Adaptive authentication 364 is an authentication and fraud detection platform for authenticating the identity of user 304 in response to transaction, such as transaction 306 of FIG. 3. Adaptive authentication 364 is a risk-based, multifactor authentication that may account for the authentication contexts in which the user requests a transaction. Using a risk and rules based approach, adaptive authentication 364 may require additional identity assurance for transaction 306, based on which of authentication contexts 504, authentication contexts 506, or authentication contexts 508 is used by identity management system 500 when the user requests the transaction.

Figure 6:
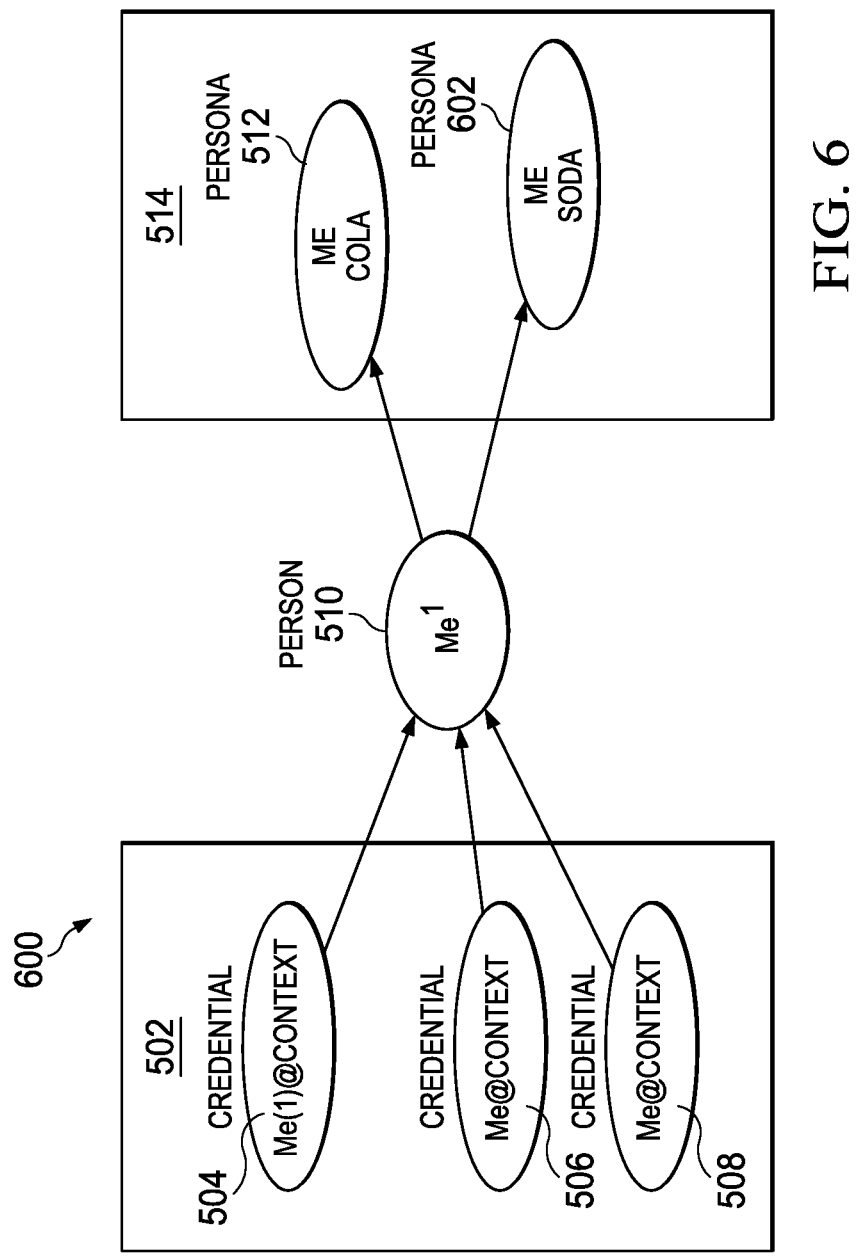
FIG. 6 is an illustration of a diagram of accessing multiple product instance through one of a plurality of context depicted according to an illustrative embodiment.

With reference now to FIG. 6, an illustration of a diagram of accessing multiple product instances through one of a plurality of context is shown according to an illustrative embodiment.

As depicted, web tier 502 includes authentication contexts 504, authentication contexts 506, and authentication contexts 508. Each of authentication contexts 504, authentication contexts 506, and authentication contexts 508 is one of authentication contexts 340 of FIG. 3, and provides a context by which a user, such as user 304 of FIG. 3 can access person record 510 of identity management system 500. When accessing person record 510, the user can then perform various actions with respect to persona 512 and persona 602, depending on which of authentication contexts 504, authentication contexts 506, and authentication contexts 508 is used to access identity management system 600.

Identity management system 600 includes an identity manager, such as identity manager 372. Identity manager 372 enables the granular management of at least one of person record 324 and documents 338 by user 304.

With reference now to FIG. 7, an illustration of a persona privileges interface shown within a graphical user interface showing default privileges for documents is depicted in accordance with an illustrative embodiment. Persona privileges interface 700 is an example of persona privileges interface 384 of FIG. 3.

As depicted, interface 700 displays context 702, context 704, context 706, and context 708. Each of context 702, context 704, context 706, and context 708 is a depiction of an authentication contexts, such as authentication contexts 340 of FIG. 3.

As depicted, interface 700 displays persona 710, persona 712, persona 714, and persona 716. Persona 710 is a representation of a user, such as user 304 of FIG. 3, within context 702. Persona 712 is a representation of the user within context 704. Persona 714 is a representation of the user within context 706. Persona 716 is a representation of user within context 708.

As depicted, interface 700 displays document 718, document 720, document 722, document 724, document 726, document 728, document 730, and documents 732. Document 718 and document 720 are indications of documents submitted within context 702. Document 722 and document 724 are indications of documents submitted within context 704. Document 726 and document 728 are indications of documents submitted within context 706. Document 730 and document 732 are indications of documents submitted within context 708.

As depicted, persona 710 is granted document privileges to both document 718 and document 720. In an illustrative embodiment, persona 710 is granted, by default, document privileges to all documents submitted within context 702.

As depicted, persona 712 is granted document privileges to both document 722 and document 724. In an illustrative embodiment, persona 712 is granted, by default, document privileges to all documents submitted within context 704.

As depicted, persona 714 is granted document privileges to both document 726 and document 728. In an illustrative embodiment, persona 714 is granted, by default, document privileges to all documents submitted within context 706.

As depicted, persona 716 is granted document privileges to both document 730 and document 732. In an illustrative embodiment, persona 716 is granted, by default, document privileges to all documents submitted within context 708.

Identity manager 372 of FIG. 3 enables the granular management of document 718, document 720, document 722, document 724, document 726, document 728, document 730, and documents 732. Through interaction with persona privileges interface 700, a user can granularly designate document privileges to any of persona 710, persona 712, persona 714, and persona 716 for access to any of document 718, document 720, document 722, document 724, document 726, document 728, document 730, and documents 732, regardless of the context in which the document originates.

With reference now to FIG. 8, an illustration of a persona privileges interface shown within a graphical user interface showing user modified privileges for documents is depicted in accordance with an illustrative embodiment. Persona privileges interface 800 is persona privileges interface 700 of FIG. 3, after receiving interactions from a user, such as user 304 of FIG. 3 modifying document privileges, such as persona document privileges 378 of FIG. 3.

As depicted, persona 710 is granted document privileges to both document 718 and document 720. In an illustrative embodiment, persona 710 is granted, by default, document privileges to all documents submitted within context 702. Through a user interaction with persona privileges interface 800, such as transaction 306 of FIG. 3, the user has granted persona 710 additional document privileges to both document 726 and document 728. Document 726 and document 728 are therefore made available to persona 710.

As depicted, persona 712 is granted document privileges to both document 722 and document 724. In an illustrative embodiment, persona 712 is granted, by default, document privileges to all documents submitted within context 704. Through a user interaction with persona privileges interface 800, such as transaction 306 of FIG. 3, the user has granted persona 712 additional document privileges to both document 718 and document 720. Document 718 and document 720 are therefore made available to persona 712.

As depicted, persona 714 is granted document privileges to both document 726 and document 728. In an illustrative embodiment, persona 714 is granted, by default, document privileges to all documents submitted within context 706. Through a user interaction with persona privileges interface 800, such as transaction 306 of FIG. 3, the user has granted persona 714 additional document privileges to both document 718 and document 720. Document 718 and document 720 are therefore made available to persona 714.

As depicted, persona 716 is granted document privileges to both document 730 and document 732. In an illustrative embodiment, persona 716 is granted, by default, document privileges to all documents submitted within context 708. Through a user interaction with persona privileges interface 800, such as transaction 306 of FIG. 3, the user has granted persona 716 additional document privileges to document 718, document 720, document 722, document 724, document 726, and document 728. Document 718, document 720, document 722, document 724, document 726, and document 728 are therefore made available to persona 716.

Through interaction with persona privileges interface 800, identity manager 372 enables granular management of each of document 718, document 720, document 722, document 724, document 726, document 728, document 730, and documents 732, regardless of the context in which the document originates.

Figure 9:
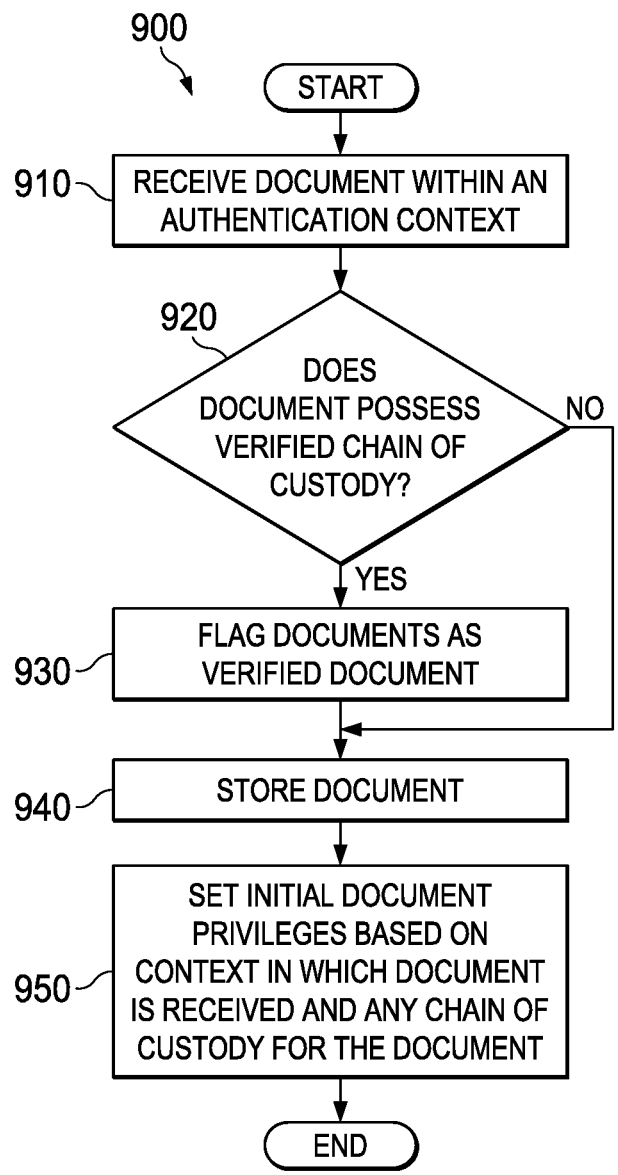
FIG. 9 is an illustration of a flowchart for storing a document within identity management system depicted according to an illustrative embodiment.

With reference now to FIG. 9, an illustration of a flowchart for storing a document within an identity management system is shown according to an illustrative embodiment.

Process 900 begins by receiving a document within an authentication contexts (step 910).

Responsive to receiving the document, process 900 determines whether the document possesses a verified chain of custody (step 920).

Responsive to determining that the document possesses a verified chain of custody ("yes" at step 920), process 900 flags the document as a verified document (step 930). Otherwise "no" at step 920", the method passes to step 940.

Process 900 stores the document (step 940).

Process 900 sets initial document privileges based on the context in which the document is received and any chain of custody for the document (step 950), with the process terminating thereafter.

Figure 10:
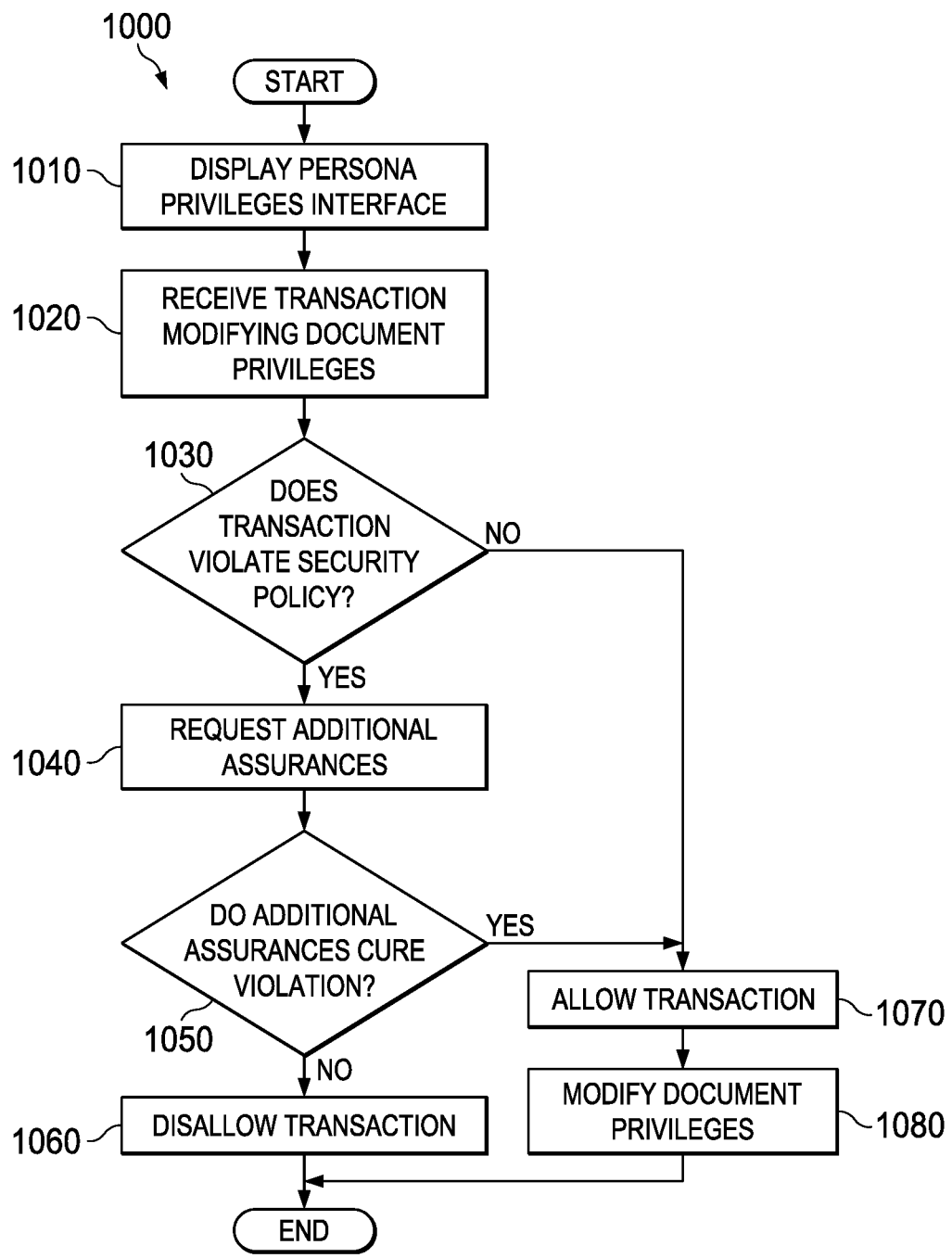
FIG. 10 is an illustration of a flowchart for modifying document privileges of a persona within an identity management system depicted according to an illustrative embodiment.

With reference now to FIG. 10, an illustration of a flowchart for modifying document privileges of a persona within an identity management system is shown according to an illustrative embodiment.

Process 1000 begins by displaying persona privileges interface (step 1010).

Process 1000 receives a transaction requesting modification to document privileges (step 1020).

Responsive to receiving transaction, process 1000 determines whether the transaction violates a security policy for validation of the user (step 1030).

Responsive to determining the transaction violates the security policy ("yes" at step 1030), process 1000 can request additional assurances to validate the user (step 1040).

Responsive to receiving any additional assurances, process 1000 determines whether the additional assurances cure the violation of the security policy for validation of the user (step 1050).

Responsive to determining that the additional assurances cannot cure the violation ("no" at step 1050), process 1000 disallows the transaction (step 1060), with the process terminating thereafter.

Responsive to determining that the additional assurances can cure the violation ("yes" at step 1050), process 1000 allows the transaction (step 1070). Process 1000 then modifies document privileges (step 1080), with the process terminating thereafter.

Returning now to step 1030, responsive to determining that the transaction does not violate security policy ("no" at step 1030), process 1000 allows the transaction (step 1070). Process 1000 then modifies document privileges (step 1080), with the process terminating thereafter.

In this manner, the publication and validation of employment documents within the plurality of online profiles can be made more easily as compared to currently used techniques. Because documents are submitted to the identity management system having a chain of custody, the veracity of the document is more trustworthy. Furthermore, by providing a granular control of document publication to the various online profiles, a user can more easily control publication of documents to the various profiles, regardless of the context in which the document is submitted to the identity management system. These and other tasks may be performed using the visualization of persona document privileges that are manipulated in interactions within a graphical user interface to generate a result. As a result, a user may more efficiently manage their various online personas and identities based on the visualization of the persona document privileges in a graphical user interface.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
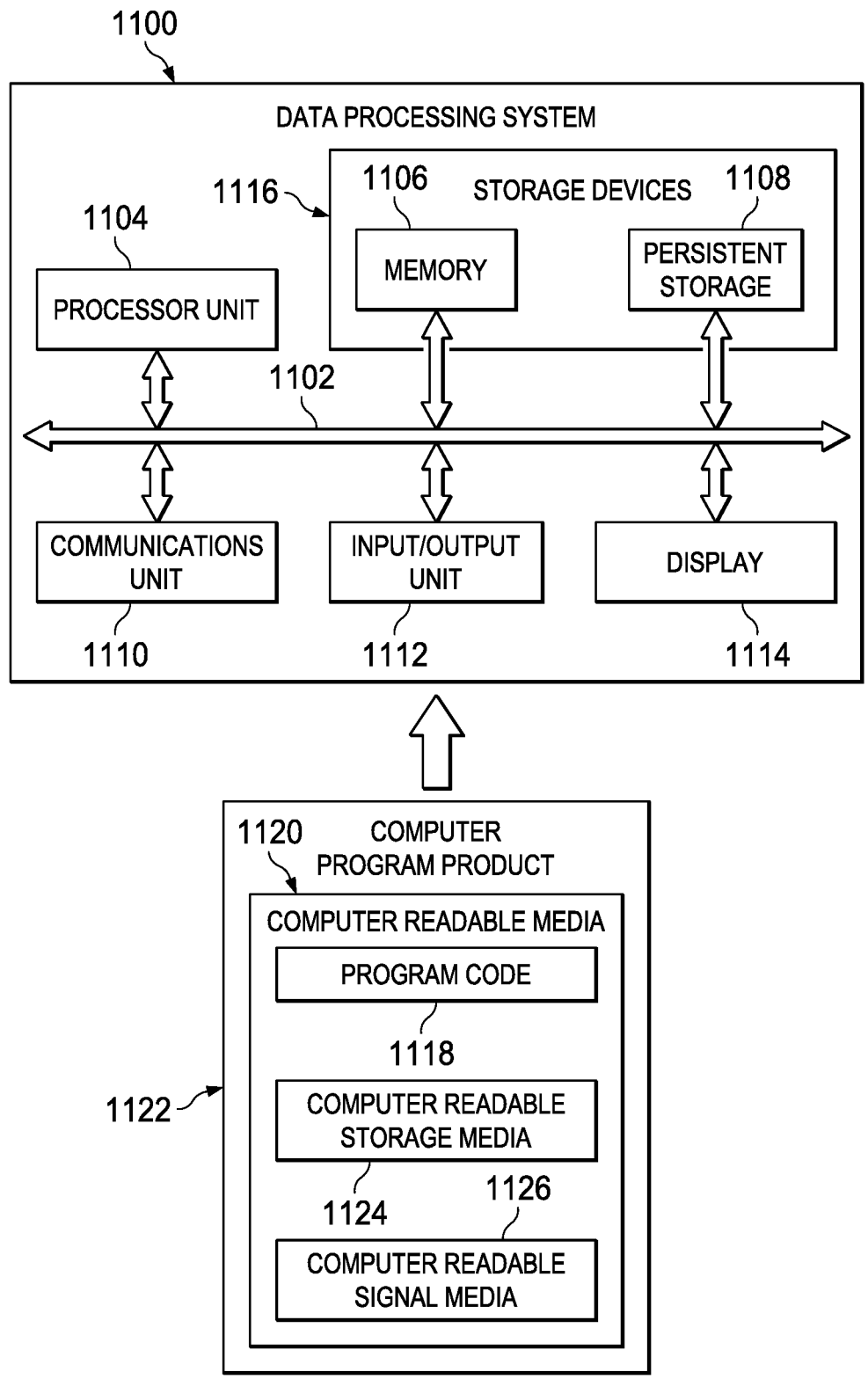
FIG. 11 is an illustration of a block diagram of a data processing system depicted in accordance with an illustrative embodiment.

Turning now to FIG. 11, an illustration of a block diagram of a data processing system is depicted in accordance with an illustrative embodiment. Data processing system 1100 may be used to implement one or more data processing systems in identity management system 302 in FIG. 3. In this illustrative example, data processing system 1100 includes communications framework 1102, which provides communications between processor unit 1104, memory 1106, persistent storage 1108, communications unit 1110, input/output unit 1112, and display 1114. In this example, communication framework may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these illustrative examples. In one example, computer readable media 1120 may be computer readable storage media 1124 or computer readable signal media 1126.

In these illustrative examples, computer readable storage media 1124 is a physical or tangible storage device used to store program code 1118 rather than a medium that propagates or transmits program code 1118.

Alternatively, program code 1118 may be transferred to data processing system 1100 using computer readable signal media 1126. Computer readable signal media 1126 may be, for example, a propagated data signal containing program code 1118. For example, computer readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

Thus, the illustrative embodiments provide a method and apparatus for managing identities have a user. In one illustrative example, a computer system comprises an identity management system for managing documents within an identity management system. The identity management system receives a document. The document is received within an authentication context of a user. The identity management system determines a chain of custody for the document. The identity management system stores the document. The identity management system sets document privileges for the document based on the authentication context in the chain of custody.

In this manner, the publication and validation of employment documents within the plurality of online profiles can be made more easily as compared to currently used techniques. Because documents are submitted to the identity management system having a chain of custody, the veracity of the document is more trustworthy. Furthermore, by providing a granular control of document publication to the various online profiles, a user can more easily control publication of documents to the various profiles, regardless of the context in which the document is submitted to the identity management system. These and other tasks may be performed using the visualization of persona document privileges that are manipulated in interactions within a graphical user interface to generate a result. As result, a user may more efficiently manage their various online personas and identities based on the visualization of the persona document privileges in a graphical user interface.

The description of the different illustrative embodiments has been presented for purposes of illustration and description, and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. In particular, word cloud generator is configured to perform the different operations described as well as other operations using at least one of program code, hardware, firmware, or other suitable components.

Figure 12:
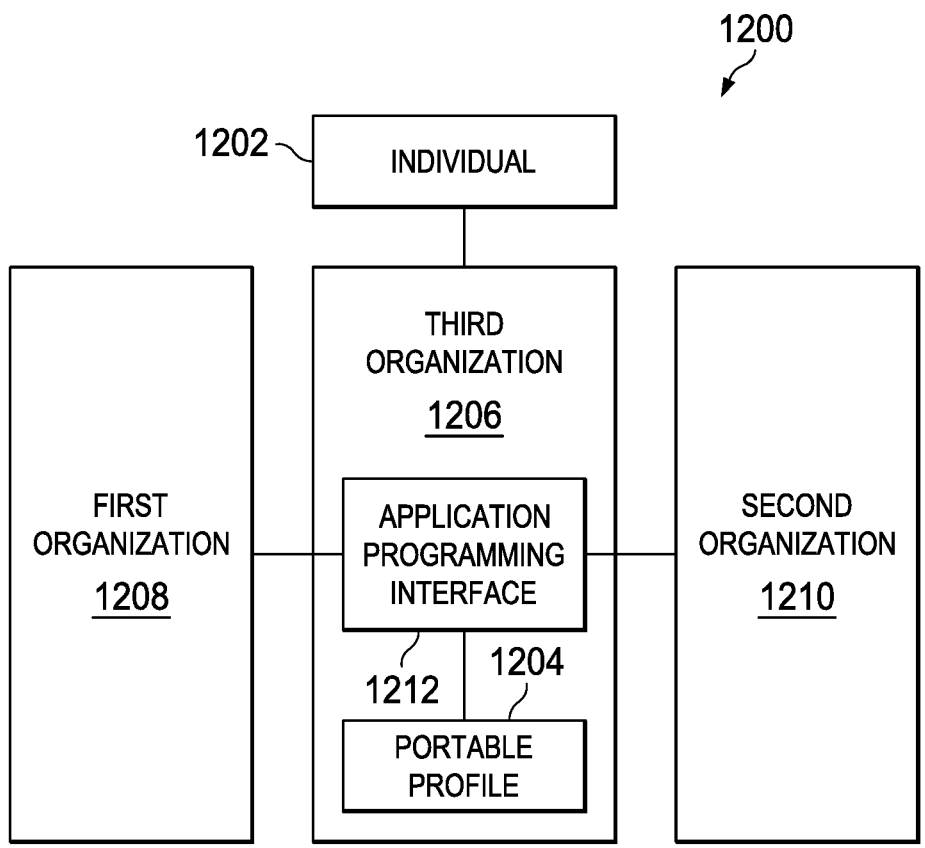
FIG. 12 is a block diagram of a portable profile, in accordance with an illustrative embodiment.

FIG. 12 is a block diagram of a portable profile, in accordance with an illustrative embodiment. FIG. 12 provides an overview of a system for creating and maintaining a portable profile for an individual such that different organizations that do not communicate with each other may take advantage of training and evaluation of the individual in one or the other organization. System 1200 may be implemented using data processing system 1100 of FIG. 11. System 1200 may be part of an identity service solution, such as those described with respect to FIG. 1 through FIG. 10.

The advantageous embodiments, including those shown in FIG. 12, provide for a centralized evolving profile of a unique individual accessible by different employers. The profile typically is not actually transferred from employer from employer. Rather, authorization to access the profile is being changed from one employer to another based on the status of the unique individual's employment status. Nevertheless, in some cases, the profile might be copied and then incorporated into an organization's internal system. Certain data in the profile would be relatively immutable, that is changed only by the third party maintaining the profile presumably upon submitted proof that the change is valid. Thus, for example, data of birth, employment history, social security information, and other relatively immutable information would be relatively immutable. However, other data may be updated by both the employee and the employers. The user profile may be used for a convenient source of employment information, for training the employee across multiple organizations, tracking user attributes of the employee, such as leadership qualities, skills, social networking, and others, and may be used for other purposes as well.

In an illustrative embodiment, individual 1202 may desire to have a portable profile 1204 available for when individual 1202 changes organizations. Individual 1202 may be a worker, typically a manager or other professional employee, but may be any individual. Individual 1202 may be a transient worker, but could also be a more permanent worker who desires to maintain an online portable and verifiable profile. Portable profile 1204 may include training and evaluation information, a resume, a curriculum vitae, or other information relevant to individual 1202 with respect to employers or other organizations in which the individual may have a role. Portable profile 1204 is generated and maintained by third organization 1206, which may be referred to as a third party organization. However, each organization with which individual 1202 interacts may have a significant amount of influence in the content and possibly even formatting of portable profile 1204.

Thus, for example, assume individual 1202 is a professional manager in a transient workforce (but need not be transient). Initially individual works for a first employer that is first organization 1208. First organization 1208 may desire to train and evaluate individual 1202. With the permission of individual 1202, first organization 1208 may use the services of third organization 1206 to handle at least some aspects of such training and evaluation, though first organization 1208 may have input as to the form of the training and evaluation. However, third organization 1206 may ensure that industry standard benchmarks are used in the training and evaluation of individual 1202. In any case, first organization 1208 may interact with third organization 1206 via application programming interface 1212 in order to influence the creation and editing of portable profile 1204.

Assume that individual 1202 then transfers from first organization 1208 to second organization 1210. Both individual 1202 and second organization 1210 are interested in avoiding loss of training and feedback or evaluation that resulted from the time individual 1202 worked for first organization 1208. Thus, individual 1202 may grant permission to second organization 1210 to access portable profile 1204 via application programming interface 1212. Second organization 1210 never communicates with first organization 1208, but now at least some aspects of the training, feedback, and evaluation individual 1202 received at first organization 1208 are available to second organization 1210. Second organization can then influence or modify portable profile 1204 with continued training, feedback, and evaluation of individual 1202 while individual 1202 works for second organization 1210.

In an illustrative embodiment, only third organization 1206 retains complete control over portable profile 1204, though the other parties shown can influence its use, creation, and modification. For example, individual 1202 may govern permissions for use of portable profile 1204 and may possibly be allowed by third organization 1206 to modify some aspects of portable profile 1204, such as for example to comment on particular feedback, training, or evaluation. In another example, third organization 1206 may provide a survey to prompt other members of first organization 1208 to provide input to that is useful in the creation and editing of portable profile 1204. Third organization 1206 may provide security during this process in order to prevent proprietary information belonging to first organization 1208 from becoming part of portable profile 1204, or at least from being accessible to other people or organizations, such as second organization 1210. In another example, second organization 1210 may provide input via application programming interface 1212, possibly prompted by a survey or request for information from third organization 1206, in order to edit or modify portable profile 1204.

Thus, portable profile 1204 may evolve over time. However, whenever individual 1202 changes to a new organization, the training, evaluation, feedback, and comments will be available to the new organization. Note that portable profile 1204 may also include information such as a resume or curriculum vitae of individual 1202. In this manner, individual 1202 may build a strong reputation based on industry standard benchmarks and other data which is easily accessible by each new organization. Additionally, a new organization is able to quickly identify any new or continuing training or coaching that would be desirable for individual 1202 with respect to the role individual 1202 plays in the new organization, simply by reference to portable profile 1204.

Stated differently, portable profile 1204 may reflect benchmark information and allow a new company to continue training and development based on an existing dynamic profile. Thus, in a sense, portable profile 1204 is "portable"; that is, accessible by many different organizations that do not communicate with each other.

In a specific example, portable profile 1204 may be created as follows. Upon an initial evaluation through an email survey to members of first organization 1208, an electronic profile is established for individual 1202. With the goal of continuous improvement for individual 1202, a server belonging to third organization 1206 uses employee electronic profiles to perform the following:

Serve personalized coaching to the individual, as if the employee has a personalized channel for training content for continuous improvement;

Provide regular feedback from other employees;

Provide benchmark information across companies and industries;

Provide networking opportunities for personal learning from other employees based on opportunity matches and skills-need mapping (mentorship);

Predict growth path and succession plans for the human resources team;

Benchmark organizational talent management against industry;

Provide input for organizational team building; and

Send out surveys, collect feedback to a manager, and establish a dynamic profile that is portable profile 1204. Once established, portable profile 1204 may be used to generate a tailored training program for individual 1202 by email, whether individual 1202 is a first organization 1208 or second organization 1210.

Thus, the illustrative embodiments may provide feedback for individual 1202 from reports that are continuously collected. Portable profile 1204 may be dynamic in the sense that it may be periodically or continuously updated by training and feedback from one, all, or combinations of individual 1202, first organization 1208, and second organization 1210, or possibly even other organizations with which individual 1202 has interacted. Thus, in some illustrative embodiments, portable profile 1204 could be modified as a result of input received by third organization 1206 from individuals or organizations with whom individual 1202 interacts but is not a member.

Thus, the illustrative embodiments recognize that the contingency work force is more common in the modern business world. Managers or other professionals may move to one company to another. However, portable profile 1204 can be made universal because it may based on industry standard, common dimensions that evaluate individual 1202. Portable profile 1204 may be continuously built, trained, and improved, no matter for whom individual 1202 works. Each new organization associated with individual 1202 may access portable profile 1204 via application programming interface 1212 with the permission of individual 1202. In some cases, individual 1202 could provide access to portable profile 1204 in order for an organization to evaluate individual 1202 for potential employment during the hiring and interview process.

The different organization would use software provided by third organization 1206. This software may be a Web-based server-side software to which an organization or individual may have at least partial access. However, only third organization 1206 retains full control over portable profile 1204 in order to ensure its integrity. Ultimately, portable profile 1204 may become a common currency of a professional or worker when moving around in the modern workforce.

In addition, data from other evaluation tools can be used to augment portable profile 1204. Thus, for example, any of third organization 1206, first organization 1208, second organization 1210, individual 1202, or other organization or individual may provide input to third organization 1206 to modify portable profile 1204. Accordingly, the illustrative embodiments provide for generating a custom assessment of individual 1202. Portable profile 1204 potentially can contain information based on every decision made in the workplace. Portable profile 1204 can be part of the resume of individual 1202.

In other illustrative embodiments, portable profile 1204 may be narrowly defined. Thus, for example, portable profile 1204 may specifically focus on training, and the tracking thereof.

The illustrative embodiments described herein may be further varied. For example, the illustrative embodiments contemplate having sub-profiles within portable profile 1204. A sub-profile may be used to provide specific information with respect to a given organization, or to provide specific information regarding a specific aspect of the training or experience or skills of individual 1202. Thus, the illustrative embodiments described above are not necessarily limited by the examples provided with respect to FIG. 12.

Figure 13:
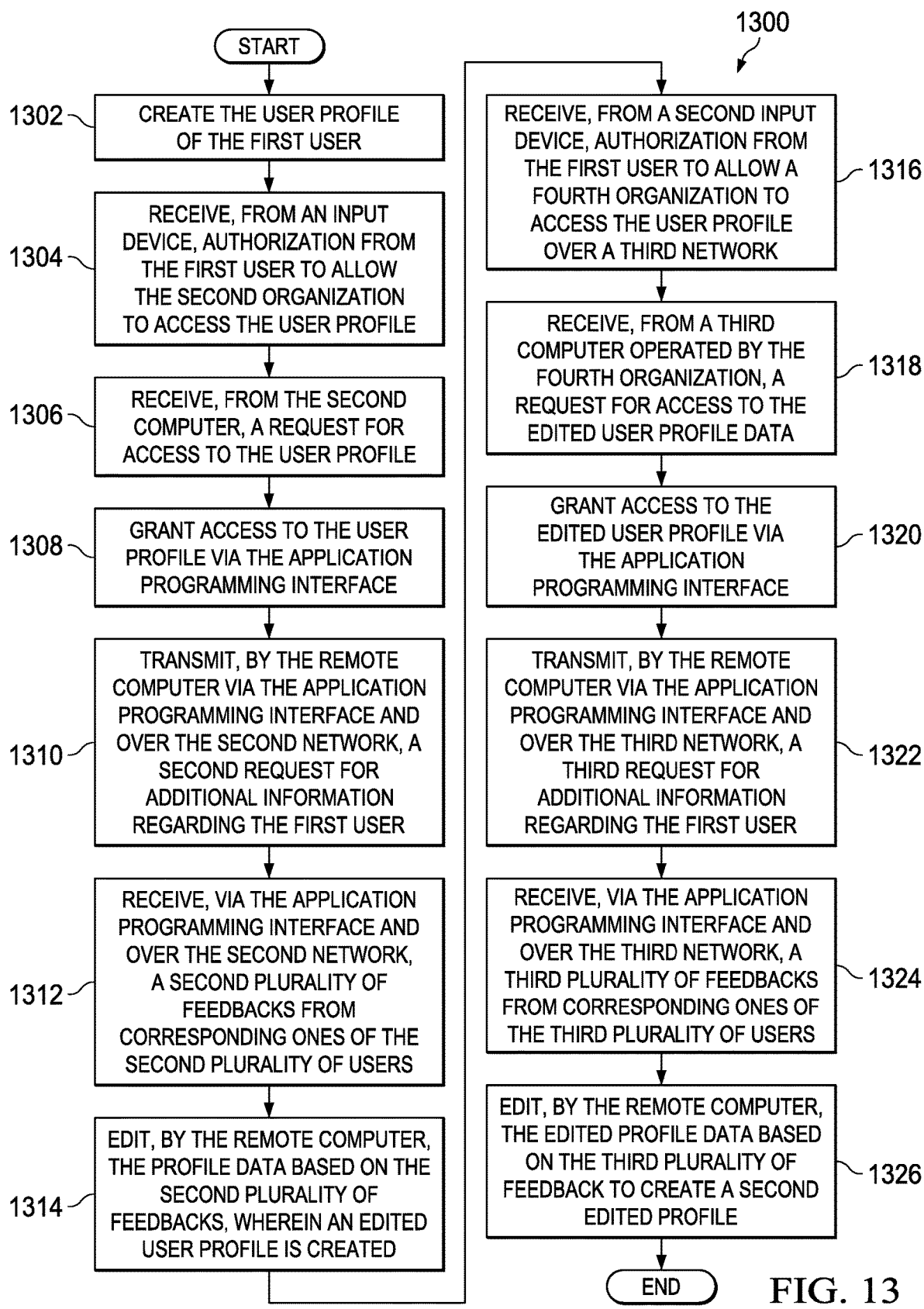
FIG. 13 is a flowchart of a method for maintaining a user profile representing evolving user profile data of a first user, the user profile accessible by a first organization and a second organization without communication between the first organization and the second organization, in accordance with an illustrative embodiment.

FIG. 13 is a flowchart of a method for maintaining a user profile representing evolving user profile data of a first user, the user profile accessible by a first organization and a second organization without communication between the first organization and the second organization, in accordance with an illustrative embodiment. Method 1300 may be implemented by a server computer, such as a data processing system 1100 of FIG. 11. Method 1300 may be implemented using system 1200 of FIG. 12.

Method 1300 may begin by creating the user profile of the first user (operation 1302). The user profile is created by a remote computer, which may be a server computer, based on a first plurality of feedbacks from a corresponding first plurality of users communicating with the remote computer via an application programming interface operating on the remote computer. The term "feedbacks" is used because each individual user in a given plurality of users provides his or her own feedback, thereby creating a unit of feedback associated for a given individual. Groups of these units of feedback may be referred to as "feedbacks", or hence a "plurality of feedbacks." The plurality of feedbacks may be an assessment of at least one of leadership qualities, job skills, and social networking capability of the first user.

The first plurality of users is communicating with the remote computer over a first network, which may be the Internet or some other network. The first plurality of users belongs to the first organization. In an illustrative embodiment, the first user also initially belongs to the first organization. The user profile data of the user profile is stored on a data source connected to the remote computer and operated only by the third organization. The application programming interface and the remote computer enable connection, over a second network, between a second computer operated by the second organization and the data source having the user profile data.

Method 1300 may also include receiving, from an input device, authorization from the first user to allow the second organization to access the user profile (operation 1304). Method 1300 may also include receiving, from the second computer, a request for access to the user profile (operation 1306). Requesting is performed via the application programming interface. The first organization does not communicate with the second organization.

Method 1300 may also include thereafter granting access to the user profile to the second computer via the application programming interface (operation 1308). In one illustrative embodiment, the method may terminate thereafter.

However, method 1300 may include additional operations. For example, method 1300 may also include the remote computer transmitting, via the application programming interface and over the second network, a second request for additional information regarding the first user (operation 1310). The second request is transmitted to a second plurality of users at the second organization.

Method 1300 may also include thereafter receiving, via the application programming interface and over the second network, a second plurality of feedbacks from corresponding ones of the second plurality of users (operation 1312). Method 1300 may also include editing, by the remote computer, the profile data based on the second plurality of feedbacks, wherein an edited user profile is created (operation 1314).

Method 1300 may also include receiving, from a second input device, authorization from the first user to allow a fourth organization to access the user profile over a third network (operation 1316). The fourth organization is different from and not in communication with any of the first organization and the second organization.

Method 1300 may also include receiving, from a third computer operated by the fourth organization, a request for access to the edited user profile data (operation 1318). Requesting is performed via the application programming interface.

Method 1300 may also include thereafter granting access to the edited user profile via the application programming interface (operation 1320). Method 1300 may also include transmitting, by the remote computer via the application programming interface and over the third network, a third request for additional information regarding the first user (operation 1322). The third request is transmitted to a third plurality of users at the fourth organization.

Method 1300 may also include thereafter receiving, via the application programming interface and over the third network, a third plurality of feedbacks from corresponding ones of the third plurality of users (operation 1324). Method 1300 may also include editing, by the remote computer, the edited profile data based on the third plurality of feedback to create a second edited profile (operation 1326).

The illustrative embodiments may be further varied. For example, the first network and the second network may be part of the Internet. The first network and the second network may be part of the same network, or may be connected only by a third or other proxy network.

In another illustrative embodiment, the authorization is received from the first user, or a representative of the first user, manipulating the input device. In this case, the authorization may be received after the first user changes from being a member of the first organization to being a member of the second organization. Additionally, the user profile data may be an evaluation of the first user based on industry standard benchmarks for a position filled by the first user at the first organization. Still further, the plurality of feedbacks may be prompted by the remote computer transmitting to the first plurality of users a survey, wherein the survey prompts acquisition of raw data to be used in preparing the user profile.

Method 1300 may be further varied. For example, Method 1300 may also include the remote computer transmitting to the first user training materials, the training materials automatically selected based on the user profile.

In another illustrative embodiment, for method 1300, transmitting the training materials may be performed after the user has left the first organization and joined the second organization, and wherein the training materials are selected based on a performance of the first user at the first organization. In still another illustrative embodiment, method 1300 may also include the remote computer transmitting to the first user training materials, the training materials automatically selected based on the edited profile data. In this case, transmitting may be performed after the user has left the first organization and joined the second organization. The training materials may be selected based on a performance of the first user at both the first organization and the second organization.

In yet another illustrative embodiment, the user profile data only contains information relating to training of the first user. In this case, the user profile may contain a sub-profile that contains a subset of information relating to the first user. The subset of information may relate to one of a particular aspect of training of the first user or information to which the first organization is limited.

Thus, method 1300 may be varied from the operations shown in FIG. 13. Accordingly, the examples described above do not necessarily limit the illustrative embodiments.

Figure 14:
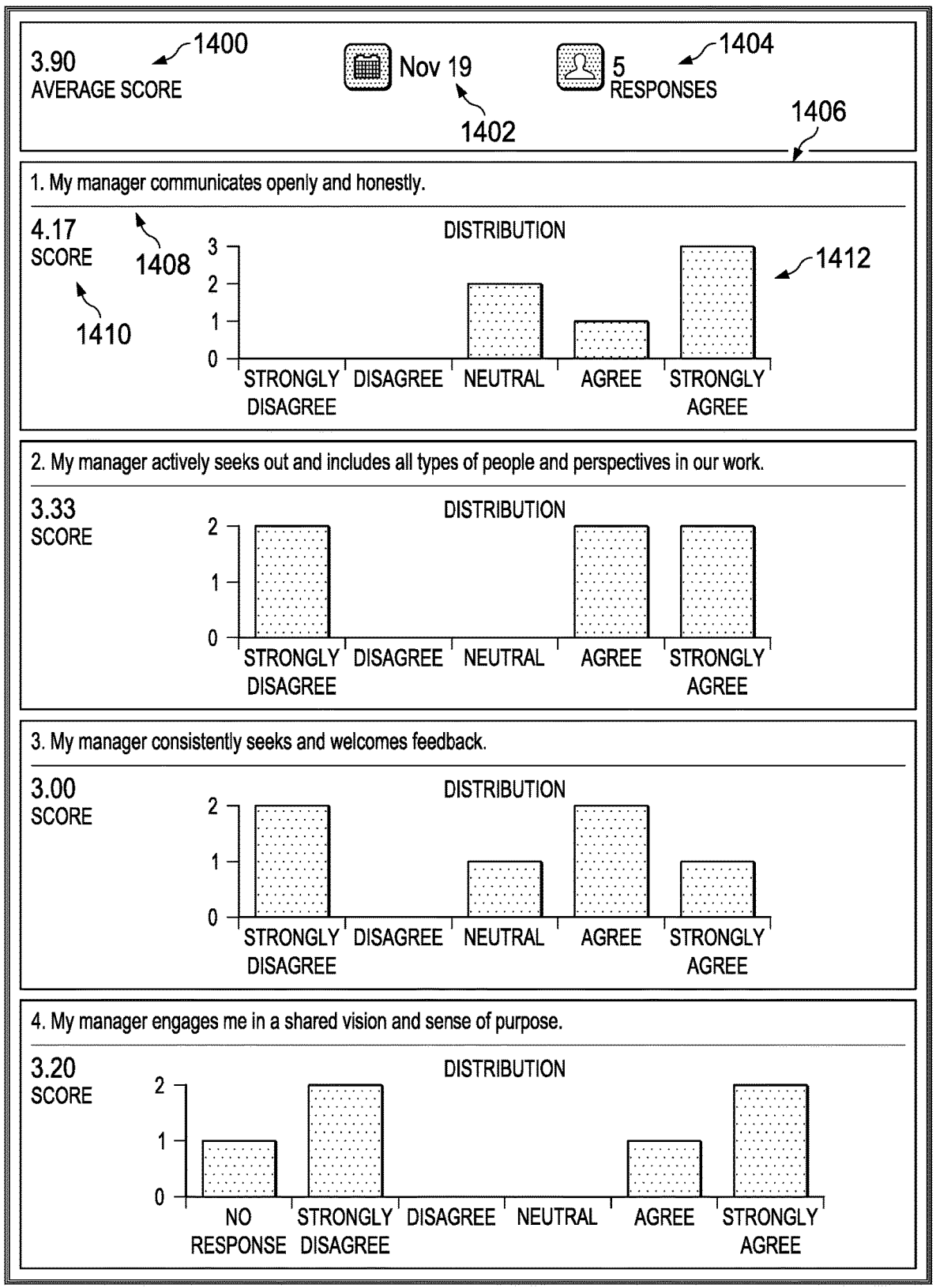
FIG. 14 is part of an example survey results which may reflect industry standard benchmarks for evaluating a manager.
Figure 15:
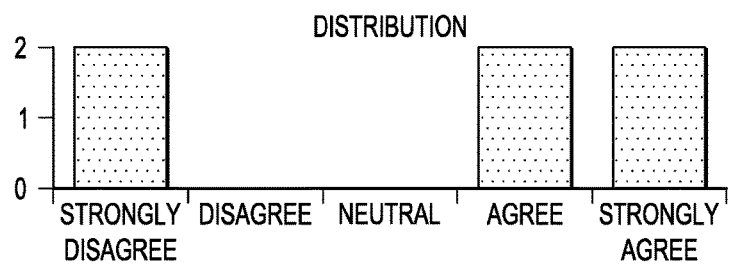
FIG. 15 is part of an example survey results which may reflect industry standard benchmarks for evaluating a manager.
Figure 15:
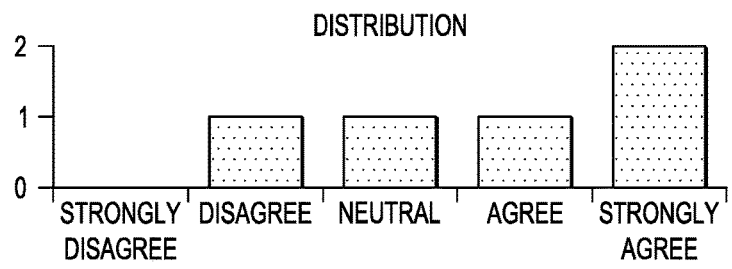
Figure 15:
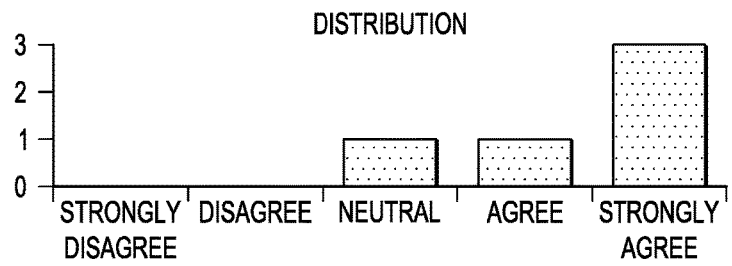
Figure 15:
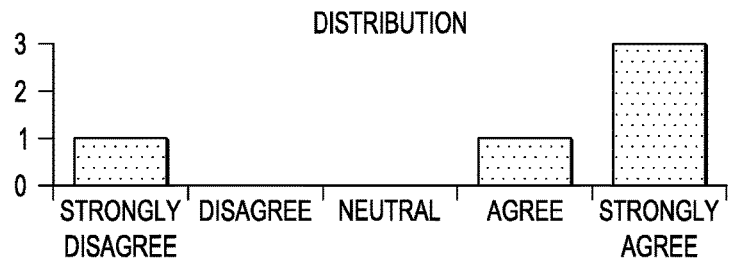

FIG. 14, FIG. 15, and FIG. 16 are all part of an example survey result which may reflect industry standard benchmarks for evaluating a manager. FIG. 14 through FIG. 16 should be considered together as a whole. In an illustrative embodiment, a third organization, such as third organization 1206 in FIG. 12 may send out survey questions corresponding to the questions shown in FIG. 14 through FIG. 16 to members of the first or second organization through the application programming interface maintained by the third organization. The remote server may receive answers back from the first or second organization, and then collate or otherwise process the results into the results shown in FIG. 14 through FIG. 16. These results can then be presented to the first user (the individual associated with the portable profile). In addition, not shown, training or coaching materials may be presented to the first user in order to aid in improving the performance or score of the first user.

FIG. 14 through FIG. 16 also provide an example of industry standard benchmarks that may be used across organizations that do not communicate with each other. For example, the results shown in FIG. 14 through FIG. 16 may have been generated as a result of input provided by a plurality of other users in the first organization. However, the returned results shown in these figures represent industry standard benchmarks for measuring the performance of a manager. Thus, when the first user provides the second organization with authorization to access the portable profile, the second organization may then review the results shown in FIG. 14 through FIG. 16 and use them in a manner similar to how the first organization could have used them.

In addition, the second organization can then modify the results shown in FIG. 14 through FIG. 16. For example, at the prompting of either the first user (owner of the profile) or the second organization (the employer), the third organization (the provider) may send a survey to a plurality of individuals in the second organization who have knowledge of the performance of the first user (employees managed by the first user) via the application programming interface. Those results are then processed by the remote server. While a completely different set of results based only on the answers from the employees of the second organization could be generated, another possibility is that the results shown in FIG. 14 through FIG. 16 may be modified based on those answers. Both a fresh report and a modified report could also be tracked. Thus, both the first individual and the second organization can see how the first user is perceived to be performing both at a given time, and overall. Still further, trends in performance improvement or decline may also be tracked.

In the specific illustrative embodiment shown in FIG. 14 through FIG. 16, survey results to a given question are shown in a block. At the top of the blocks is average score 1400, date 1402, and number 1404 which reflects the number of individuals responding to the survey. In each block, the question posed is displayed, an average score for that question is shown, and a bar chart shows the number of results per category. Thus, for example, block 1406 includes question posed 1408, average score 1410 for that question, and bar chart 1412 which shows the number of results per category. In this particular example, five categories from "strongly disagree" to "strongly agree" are displayed along the horizontal axis. The values shown on the vertical axis represents the number of responders for a given category. The other blocks shown in FIG. 14 through FIG. 16 follow a similar pattern, though different questions, scores, and bar charts are shown in order to provide examples of industry standard benchmarks for evaluating a manager's performance.

Note that how the information in FIG. 14 through FIG. 16 is displayed may be varied. The locations where information is displayed within a screen may be varied. Bar charts may be replaced with pie charts or other kinds of charts. Different colors may be used to highlight different aspects of the response. The blocks may be arranged in different patterns, or may be arranged by category of question. Many other variations are possible. Thus, the illustrative embodiments shown in FIG. 14 through FIG. 16 do not necessarily limit the claimed inventions presented below.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for centrally maintaining a user profile representing evolving user profile data of a first user, the user profile accessible by a first organization and a second organization without communication between the first organization and the second organization, the method comprising:

storing, by a remote computer, user profile data of the user profile on a data source connected to the remote computer and operated only by a third organization;

creating, by the remote computer, the user profile of the first user, wherein the user profile is based on a first plurality of feedbacks from a corresponding first plurality of users that belong to the first organization, wherein the first plurality of users communicate with the remote computer over a first network via an application programming interface operating on the remote computer;

receiving, by the remote computer from an input device, authorization from the first user to allow a second organization to access the user profile, wherein the authorization is received from the first user, or a representative of the first user, manipulating the input device, and wherein the authorization is received after the first user changes from being a member of the first organization to being a member of the second organization;

receiving, by the remote computer, a request, from a second computer operated by the second organization, for access to the user profile, wherein requesting is performed via the application programming interface, and wherein the first organization does not communicate with the second organization;

responsive to receiving the request, granting, by the remote computer, the second computer access to the user profile, including aspects of the first plurality of feedbacks, via a connection to the data source over a second network, wherein the application programming interface and the remote computer enable the connection over the second network; and transmitting, by the remote computer, training materials to the first user after the first user has left the first organization and joined the second organization, wherein the training materials are automatically selected based on the user profile and on a performance of the first user at the first organization.

2. The method of claim 1 further comprising:
the remote computer transmitting, via the application programming interface and over the second network, a second request for additional information regarding the first user, wherein the second request is transmitted to a second plurality of users at the second organization;
thereafter receiving, via the application programming interface and over the second network, a second plurality of feedbacks from corresponding ones of the second plurality of users; and editing, by the remote computer, the profile data based on the second plurality of feedbacks, wherein an edited user profile is created.

3. The method of claim 2 further comprising:
receiving, from a second input device, authorization from the first user to allow a fourth organization to access the user profile over a third network, the fourth organization being different from and not in communication with any of the first organization and the second organization;
receiving, from a third computer operated by the fourth organization, a request for access to the edited user profile, wherein requesting is performed via the application programming interface; and
thereafter granting access to the edited user profile via the application programming interface.

4. The method of claim 3 further comprising:
transmitting, by the remote computer via the application programming interface and over the third network, a third request for additional information regarding the first user, wherein the third request is transmitted to a third plurality of users at the fourth organization;
thereafter receiving, via the application programming interface and over the third network, a third plurality of feedbacks from corresponding ones of the third plurality of users; and
editing, by the remote computer, the edited user profile data based on the third plurality of feedback to create a second edited user profile.

5. The method of claim 1, wherein the first network and the second network are part of the Internet.

6. The method of claim 1, wherein the user profile data comprises an evaluation of the first user based on industry standard benchmarks for a position filled by the first user at the first organization.

7. The method of claim 6, wherein the plurality of feedbacks is prompted by the remote computer transmitting to the first plurality of users a survey, wherein the survey prompts acquisition of raw data to be used in preparing the user profile.

8. The method of claim 2, wherein the training materials are automatically selected based on the edited user profile data.

9. The method of claim 8, wherein the training materials are selected based on a performance of the first user at both the first organization and the second organization.

10. The method of claim 1, wherein the user profile data only contains information relating to training of the first user.

11. The method of claim 10, wherein the user profile contains a sub-profile that contains a subset of information relating to the first user, and wherein the subset of information relates to one of a particular aspect of training of the first user or information to which the first organization is limited.

12. The method of claim 1, wherein the plurality of feedbacks comprise an assessment of at least one of leadership qualities, job skills, and social networking capability of the first user.

13. The method of claim 1 further comprising:
the third organization denying any of the first user, the first organization, and the second organization authorization to edit immutable information regarding the first user.

14. A server computer comprising:
a processor:
a bus connected to the processor; and
a non-transitory computer readable storage medium connected to the bus and storing program code which, when executed by the processor, provides for a method for maintaining a user profile representing evolving user profile data of a first user, the user profile accessible by a first organization and a second organization without communication between the first organization and the second organization, the program code comprising:
program code for storing, by a remote computer, user profile data of the user profile on a data source connected to the remote computer and operated only by a third organization;
program code for creating, by the remote computer, the user profile of the first user, wherein the user profile is based on a first plurality of feedbacks from a corresponding first plurality of users that belong to the first organization, wherein the first plurality of users communicate with the remote computer over a first network via an application programming interface operating on the remote computer;
program code for receiving, by the remote computer from an input device, authorization from the first user to allow a second organization to access the user profile, wherein the authorization is received from the first user, or a representative of the first user, manipulating the input device, and wherein the authorization is received after the first user changes from being a member of the first organization to being a member of the second organization;
program code for receiving, by the remote computer, a request, from a second computer operated by the second organization, for access to the user profile, wherein requesting is performed via the application programming interface, and wherein the first organization does not communicate with the second organization;
program code for, in response to receiving the request, granting, by the remote computer the second computer, access to the user profile via a connection to the data source over a second network, wherein the application programming interface and the remote computer enable the connection over the second network; and
program code for transmitting, by the remote computer, training materials to the first user after the first user has left the first organization and joined the second organization, wherein the training materials are automatically selected based on the user profile and on a performance of the first user at the first organization.

15. The server computer of claim 14, wherein the program code further comprises:
program code for the server computer transmitting, via the application programming interface and over the second network, a second request for additional information regarding the first user, wherein the second request is transmitted to a second plurality of users at the second organization;
program code for, thereafter, receiving, via the application programming interface and over the second network, a second plurality of feedbacks from corresponding ones of the second plurality of users; and
program code for editing, by the server computer, the profile data based on the second plurality of feedback, wherein an edited profile is created.

16. A computer program product comprising:
a non-transitory computer readable storage medium storing program code which, when executed by a processor of a server computer, provides for a method for maintaining a user profile representing evolving user profile data of a first user, the user profile accessible by a first organization and a second organization without communication between the first organization and the second organization, the program code comprising:
program code for storing, by a remote computer, user profile data of the user profile on a data source connected to the remote computer and operated only by a third organization;
program code for creating, by the remote computer, the user profile of the first user, wherein the user profile is based on a first plurality of feedbacks from a corresponding first plurality of users that belong to the first organization, wherein the first plurality of users communicate with the remote computer over a first network via an application programming interface operating on the remote computer;
program code for receiving, by the remote computer from an input device, authorization from the first user to allow a second organization to access the user profile, wherein the authorization is received from the first user, or a representative of the first user, manipulating the input device, and wherein the authorization is received after the first user changes from being a member of the first organization to being a member of the second organization;
program code for receiving, by the remote computer, a request, from a second computer operated by the second organization, for access to the user profile, wherein requesting is performed via the application programming interface, and wherein the first organization does not communicate with the second organization;
program code for, in response to receiving a request, granting, by the remote computer, the second computer access to the user profile via a connection to the data source over a second network, wherein the application programming interface and the remote computer enable the connection over the second network; and
program code for transmitting, by the remote computer, training materials to the first user after the first user has left the first organization and joined the second organization, wherein the training materials are automatically selected based on the user profile and on a performance of the first user at the first organization.

17. The computer program product of claim 16, wherein the program code further comprises:
program code for the server computer transmitting, via the application programming interface and over the second network, a second request for additional information regarding the first user, wherein the second request is transmitted to a second plurality of users at the second organization;
program code for, thereafter, receiving, via the application programming interface and over the second network, a second plurality of feedbacks from corresponding ones of the second plurality of users; and
program code for editing, by the server computer, the profile data based on the second plurality of feedback, wherein an edited profile is created.

* * * * *